(12) United States Patent
Nonaka et al.

(10) Patent No.: US 8,423,168 B2
(45) Date of Patent: Apr. 16, 2013

(54) BOTTLENECK DEVICE EXTRACTING METHOD AND BOTTLENECK DEVICE EXTRACTING ASSISTANCE DEVICE

(75) Inventors: Yoichi Nonaka, Yokohama (JP); Lengyel Attila, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 300 days.

(21) Appl. No.: 12/810,614

(22) PCT Filed: Dec. 16, 2008

(86) PCT No.: PCT/JP2008/072831
§ 371 (c)(1),
(2), (4) Date: Sep. 23, 2010

(87) PCT Pub. No.: WO2009/084423
PCT Pub. Date: Jul. 9, 2009

(65) Prior Publication Data
US 2011/0022212 A1    Jan. 27, 2011

(30) Foreign Application Priority Data
Dec. 27, 2007   (JP) .................................. 2007-335594

(51) Int. Cl.
*G06F 19/00*   (2011.01)

(52) U.S. Cl.
USPC .............................. 700/99; 700/101; 700/108

(58) Field of Classification Search .................... 700/99, 700/101, 108
See application file for complete search history.

(56) References Cited

U.S. PATENT DOCUMENTS

| 5,880,960 | A * | 3/1999 | Lin et al. ......................... 700/99 |
| 6,438,436 | B1 * | 8/2002 | Hohkibara et al. ............. 700/97 |
| 6,519,498 | B1 * | 2/2003 | Jevtic et al. ................... 700/101 |
| 6,631,305 | B2 * | 10/2003 | Newmark ..................... 700/110 |
| 6,782,302 | B1 * | 8/2004 | Barto et al. ................... 700/101 |

(Continued)

FOREIGN PATENT DOCUMENTS

| JP | 06-069089 | 3/1994 |
| JP | 9-282359 | 10/1997 |

(Continued)

OTHER PUBLICATIONS

Office Action in Korean Patent Appln. No. 9-5-2011-076012341, dated Dec. 22, 2011 (in Korean), [8 pages].

(Continued)

*Primary Examiner* — Michael D Masinick
(74) *Attorney, Agent, or Firm* — Antonelli, Terry, Stout & Kraus, LLP.

(57) ABSTRACT

A method and system of specifying a device that is the root cause of impeding productivity of a production line in consideration of even mutual influence among processes of production fluctuation with respect to the subject of specifying a device in which productive capacity is reduced due to a problem that the productive capacity of the device is changed due to production that one machine works for multiple process and a problem that the productive capacity of device is changed due to high product mix and low product volume production. A measure for changing productive capacity of devices intentionally and simulating influence to the whole production system, a measure for measuring mutual influence among processes of production fluctuation produced by the simulation and a measure for specifying a device that is the root cause of impeding the productivity on the basis of the measured result are provided.

6 Claims, 25 Drawing Sheets

U.S. PATENT DOCUMENTS

| | | | |
|---|---|---|---|
| 6,801,819 B1 * | 10/2004 | Barto et al. | 700/99 |
| 6,904,329 B1 * | 6/2005 | Barto et al. | 700/99 |
| 7,403,832 B2 * | 7/2008 | Schulze et al. | 700/110 |
| 7,715,936 B2 * | 5/2010 | Thierauf | 700/99 |
| 2006/0271225 A1 * | 11/2006 | Schulze et al. | 700/108 |

FOREIGN PATENT DOCUMENTS

| | | |
|---|---|---|
| JP | 2793442 | 6/1998 |
| JP | 2004-013825 | 1/2004 |
| JP | 2004-503837 | 2/2004 |
| JP | 2004-246404 | 9/2004 |
| JP | 2006-507568 | 3/2006 |
| KR | 10-2005-0042167 | 5/2006 |
| WO | WO 00/25273 | 5/2000 |
| WO | WO 2007/036985 | 4/2007 |

OTHER PUBLICATIONS

Office Action in Chinese Patent Appln. No. 100082, dated Dec. 23, 2011 (in Chinese), [3 pages].

Youichi Nonaka et al., Monitoring Variance in Manufacturing System Performances, Proc. $40^{th}$ CIRP International Manufacturing Systems Seminar 2007.

Wallance J Hopp et al., Variability Basics, Factory Physics, 1955, pp. 248-286.

* cited by examiner

FIG. 3

| TIME | PRODUCTION PROCESS (i: PROCESS NUMBER) | | | | | | | | | |
|---|---|---|---|---|---|---|---|---|---|---|
| | $P_1$ | $P_2$ | ... | $P_{i-1}$ | $P_i$ | $P_{i+1}$ | ... | $P_n$ | | |
| ... | ... | ... | ... | ... | ... | ... | ... | ... | | |
| $T_{a-1}$ | $C_{1a-1}$ | $C_{2a-1}$ | ... | $C_{i-1a-1}$ | $C_{ia-1}$ | $C_{i+1a-1}$ | ... | $C_{na-1}$ | | |
| $T_a$ | $C_{1a}$ | $C_{2a}$ | ... | $C_{i-1a}$ | $C_{ia}$ | $C_{i+1a}$ | ... | $C_{na}$ | | |
| $T_{a+1}$ | $C_{1a+1}$ | $C_{2a+1}$ | ... | $C_{i-1a+1}$ | $C_{ia+1}$ | $C_{i+1a+1}$ | ... | $C_{na+1}$ | | |
| ... | ... | ... | ... | ... | ... | ... | ... | ... | | |

TIME SECTION $T_s$

FIG. 4

| TIME | PRODUCTION PROCESS (i: PROCESS NUMBER) | | | | | | | | | | |
|---|---|---|---|---|---|---|---|---|---|---|---|
| | | $P_1$ | $P_2$ | ... | ... | $P_{i-1}$ | $P_i$ | $P_{i+1}$ | ... | ... | $P_n$ |
| ... | | ... | ... | | | | | | | | ... |
| $T_{a-1}$ | | $C_{1a-1}$ | $C_{2a-1}$ | ... | | $C_{i-1a-1}$ | $C_{ia-1}$ | $C_{i+1a-1}$ | ... | ... | $C_{na-1}$ |
| $T_a$ | | $C_{1a}$ | $C_{2a}$ | ... | | $C_{i-1a}$ | $C_{ia}$ | $C_{i+1a}$ | ... | ... | $C_{na}$ |
| $T_{a+1}$ | | $C_{1a+1}$ | $C_{2a+1}$ | | ... | $C_{i-1a+1}$ | $C_{ia+1}$ | $C_{i+1a+1}$ | ... | ... | $C_{na+1}$ |
| ... | | ... | ... | | | | ... | ... | ... | ... | ... |

TIME SECTION Ts

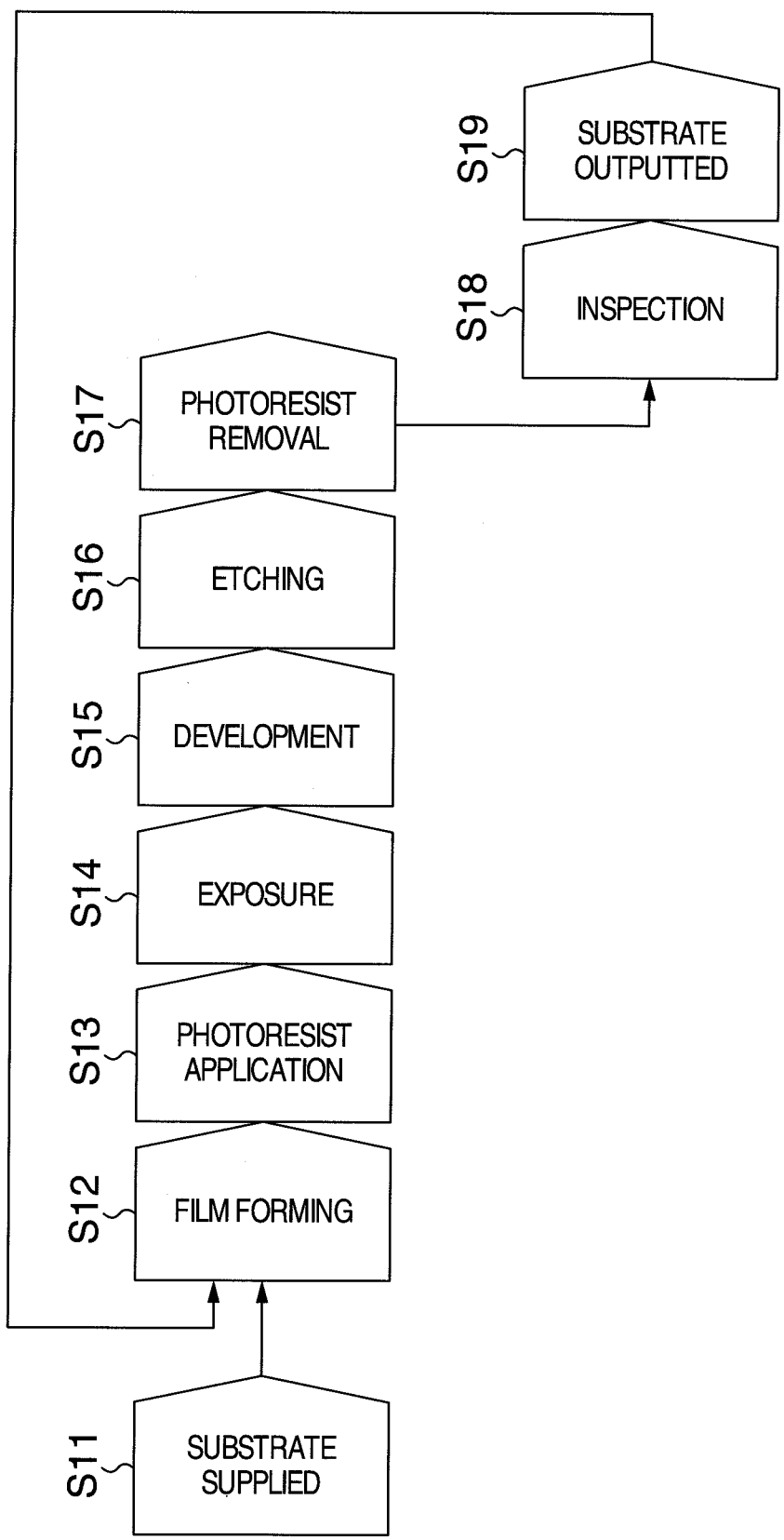

FIG. 6

PRODUCT (KIND) NAME:ASIC2007    PRODUCTION INDEX: THROUGHPUT

601

| DATA ID | MANUFACTURING DEVICE NAME | PROCESS NAME | DATA COLLECTION DATE | PRODUCTION INDEX COLLECTION RESULT VALUE |
|---|---|---|---|---|
| ----- | ------- | -------------- | -------- | -------- |
| 00000021 | FILM FORMING DEVICE A | 1ST LAYER: FILM FORMING | 2007/05/12 10:00 | 37 (PIECES) |
| 00000022 | PHOTORESIST APPLICATION A | 1ST LAYER: PHOTORESIST APPLICATION | 2007/05/12 10:00 | 44 (PIECES) |
| 00000023 | EXPOSURE A | 1ST LAYER:EXPOSURE | 2007/05/12 10:00 | 20 (PIECES) |
| 00000024 | EXPOSURE B | 1ST LAYER:EXPOSURE | 2007/05/12 10:00 | 18 (PIECES) |
| 00000025 | DEVELOPMENT A | 1ST LAYER: DEVELOPMENT | 2007/05/12 10:00 | 35 (PIECES) |
| 00000026 | ETCHING A | 1ST LAYER: ETCHING | 2007/05/12 10:00 | 32 (PIECES) |
| 00000027 | PHOTORESIST REMOVAL A | 1ST LAYER: PHOTORESIST REMOVAL | 2007/05/12 10:00 | 40 (PIECES) |
| 00000028 | FILM FORMING DEVICE A | 1ST LAYER: FILM FORMING | 2007/05/12 12:00 | 39 (PIECES) |
| 00000029 | FILM FORMING DEVICE B | 2ND LAYER: FILM FORMING | 2007/05/12 12:00 | 34 (PIECES) |
| 00000030 | PHOTORESIST APPLICATION A | 1ST LAYER: PHOTORESIST APPLICATION | 2007/05/12 12:00 | 38 (PIECES) |
| 00000031 | PHOTORESIST APPLICATION A | 2ND LAYER: PHOTORESIST APPLICATION | 2007/05/12 12:00 | 12 (PIECES) |
| 00000032 | PHOTORESIST APPLICATION B | 2ND LAYER: PHOTORESIST APPLICATION | 2007/05/12 12:00 | 28 (PIECES) |
| 00000033 | EXPOSURE A | 1ST LAYER:EXPOSURE | 2007/05/12 12:00 | 21 (PIECES) |
| 00000034 | EXPOSURE B | 1ST LAYER:EXPOSURE | 2007/05/12 12:00 | 14 (PIECES) |
| 00000035 | EXPOSURE B | 2ND LAYER: EXPOSURE | 2007/05/12 12:00 | 8 (PIECES) |
| 00000036 | EXPOSURE C | 2ND LAYER: EXPOSURE | 2007/05/12 12:00 | 19 (PIECES) |
| ----- | ------- | -------------- | -------- | -------- |
| 00000106 | FILM FORMING DEVICE A | 1ST LAYER: FILM FORMING | 2007/05/14 16:00 | 16 (PIECES) |
| 00000107 | FILM FORMING DEVICE A | 2ND LAYER: FILM FORMING | 2007/05/14 16:00 | 28 (PIECES) |
| 00000108 | FILM FORMING DEVICE B | 2ND LAYER: FILM FORMING | 2007/05/14 16:00 | 11 (PIECES) |
| 00000109 | FILM FORMING DEVICE B | 3RD LAYER: FILM FORMING | 2007/05/14 16:00 | 26 (PIECES) |
| 00000110 | PHOTORESIST APPLICATION A | 1ST LAYER: PHOTORESIST APPLICATION | 2007/05/14 16:00 | 31 (PIECES) |
| ----- | ------- | -------------- | -------- | -------- |

FIG. 7

| PROCESS NO(i) | PROCESS NAME |
|---|---|
| ------- | -------------------- |
| 0005 | 1ST LAYER: FILM FORMING |
| 0006 | 1ST LAYER: PHOTORESIST APPLICATION |
| 0007 | 1ST LAYER: EXPOSURE |
| 0008 | 1ST LAYER: DEVELOPMENT |
| 0009 | 1ST LAYER: ETCHING |
| 0010 | 1ST LAYER: PHOTORESIST REMOVAL |
| ------- | -------------------- |
| 0013 | 2ND LAYER: FILM FORMING |
| 0014 | 2ND LAYER: PHOTORESIST APPLICATION |
| 0015 | 2ND LAYER: EXPOSURE |
| 0016 | 2ND LAYER: DEVELOPMENT |
| 0017 | 2ND LAYER: ETCHING |
| 0018 | 2ND LAYER: PHOTORESIST REMOVING |
| ------- | -------------------- |
| 0231 | n-TH LAYER: FILM FORMING |
| 0232 | n-TH LAYER: PHOTORESIST APPLICATION |
| 0233 | n-TH LAYER: EXPOSURE |
| 0234 | n-TH LAYER: DEVELOPMENT |
| 0235 | n-TH LAYER: ETCHING |
| 0236 | n-TH LAYER: PHOTORESIST REMOVING |
| ------- | -------------------- |
| 0287 | INSPECTION |
| ------- | -------------------- |

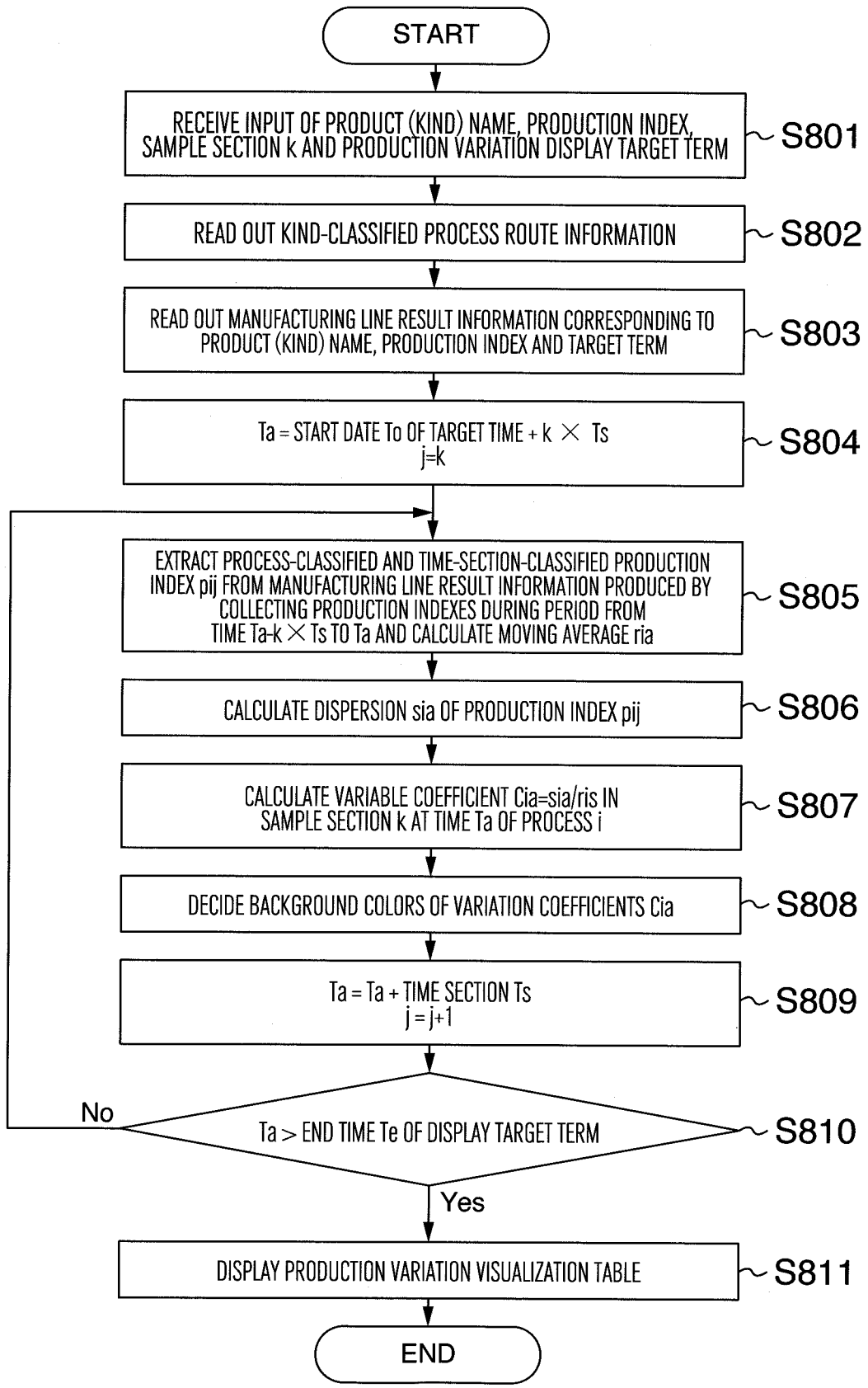

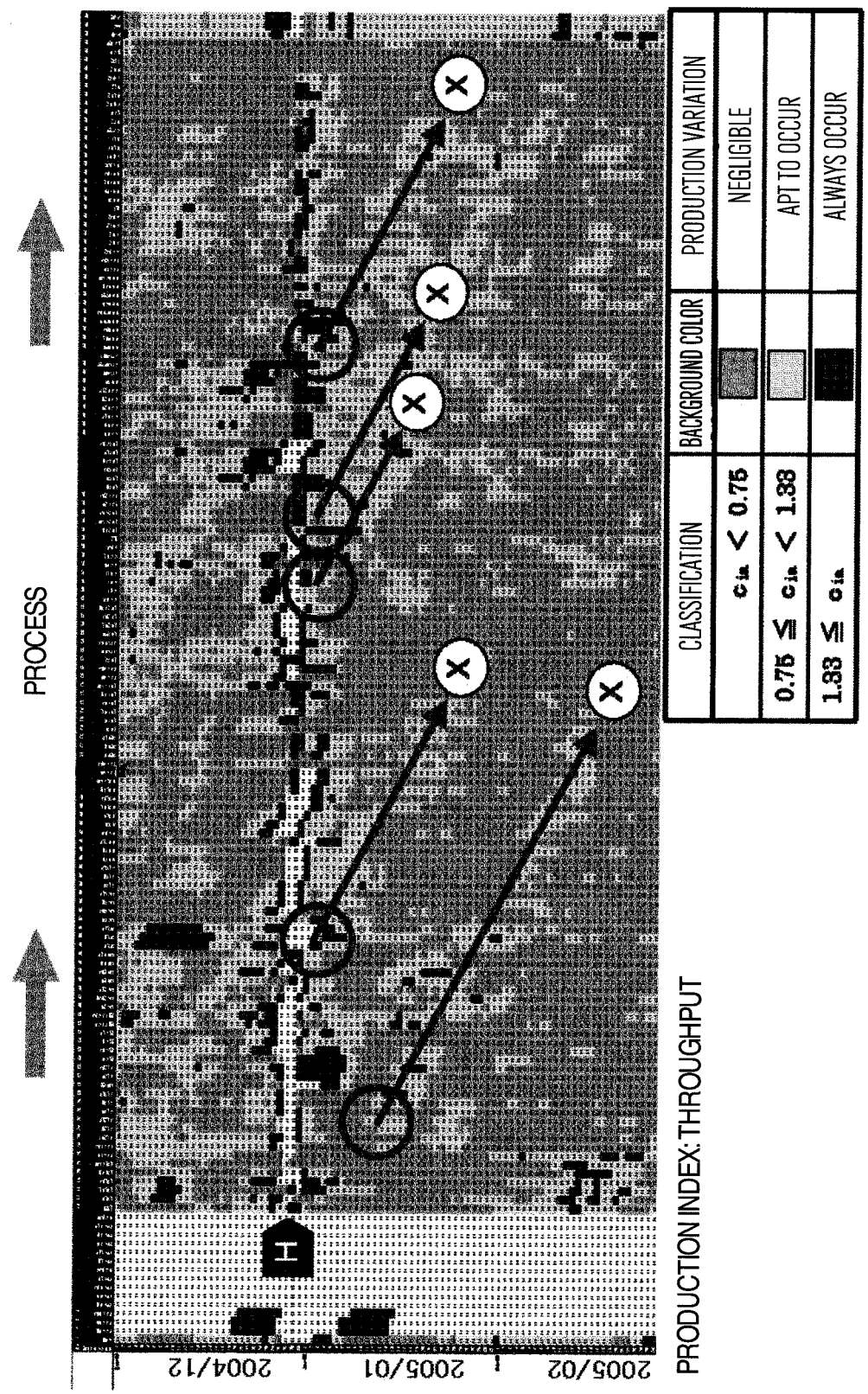

FIG. 10

| PRODUCT (KIND) NAME | QUANTITY | WORK COMPLETED DAY | ────────── |
|---|---|---|---|
| ASIC2007 | 1200 | 2007/05/20 | ────────── |
| DRAM209 | 350 | 2007/06/10 | ────────── |
| SRAM116 | 2400 | 2007/07/08 | ────────── |
| ────────── | ────────── | ────────── | ────────── |
| ────────── | ────────── | ────────── | ────────── |

1001

SETTING OF PRODUCTION INDEX VARIATION INITIAL INFORMATION

SETTING OF PRODUCTION INDEX VARIATION INITIAL INFORMATION

FIG. 14

KIND-CLASSIFIED PROCESS ROUTE AND MANUFACTURING DEVICE INFORMATION
PRODUCT (KIND) NAME:ASIC2007     1401

| PROCESS NO (i) | PROCESS NAME | MANUFACTURING DEVICE NAME AND PRODUCTION QUANTITY PER UNIT TIME |
|---|---|---|
| ------- | ------------------ | ------------------------ |
| 0005 | 1ST LAYER: FILM FORMING | FILM FORMING DEVICE A: 40 |
| 0006 | 1ST LAYER: PHOTORESIST APPLICATION | PHOTORESIST APPLICATION A: 40 |
| 0007 | 1ST LAYER: EXPOSURE | EXPOSURE A: 20, EXPOSURE B: 20 |
| 0008 | 1ST LAYER: DEVELOPMENT | DEVELOPMENT A: 40 |
| 0009 | 1ST LAYER: ETCHING | ETCHING A: 40 |
| 0010 | 1ST LAYER: PHOTORESIST REMOVAL | PHOTORESIST REMOVING A: 40 |
| ------- | ------------------ | ------------------------ |
| 0013 | 2ND LAYER:FILM FORMING | FILM FORMING DEVICE B: 40 |
| 0014 | 2ND LAYER: PHOTORESIST APPLICATION | PHOTORESIST APPLICATION A: 12, PHOTORESIST APPLICATION B: 28 |
| 0015 | 2ND LAYER:EXPOSURE | EXPOSURE B: 10, EXPOSURE C: 20, EXPOSURE D: 10 |
| 0016 | 2ND LAYER:DEVELOPMENT | DEVELOPMENT B: 20, DEVELOPMENT C: 20 |
| 0017 | 2ND LAYER:ETCHING | ETCHING B: 40 |
| 0018 | 2ND LAYER: PHOTORESIST REMOVAL | PHOTORESIST REMOVING B: 30, PHOTORESIST REMOVING C: 10 |
| ------- | ------------------ | ------------------------ |
| 0231 | n-TH LAYER:FILM FORMING | FILM FORMING DEVICE D: 25, FILM FORMING DEVICE A: 15 |
| 0232 | n-TH LAYER: PHOTORESIST APPLICATION | PHOTORESIST APPLICATION B: 10, PHOTORESIST APPLICATION C: 30 |
| 0233 | n-TH LAYER:EXPOSURE | EXPOSURE A: 5, EXPOSURE E: 25, EXPOSURE F: 10 |
| 0234 | n-TH LAYER:DEVELOPMENT | DEVELOPMENT C: 20, DEVELOPMENT D: 20 |
| 0235 | n-TH LAYER:ETCHING | ETCHING A: 10, ETCHING C: 30 |
| 0236 | n-TH LAYER: PHOTORESIST REMOVAL | PHOTORESIST REMOVING C: 10, PHOTORESIST REMOVING E: 30 |
| ------- | ------------------ | ------------------------ |
| 0287 | INSPECTION | ------------------------ |
| ------- | ------------------ | ------------------------ |

FIG. 15

1501　　PRODUCT (KIND) NAME:ASIC2007　　PRODUCTION INDEX: THROUGHPUT

| | MANUFACTURING DEVICE NAME | PROCESS NAME | SIMULATION RESULT COLLECTION DATE | SIMULATION PRODUCTION INDEX VALUE | QUANTITY OF BUFFER IN PROCESS (PIECES) |
|---|---|---|---|---|---|
| ----- | ------- | ------------ | --------- | --------- | ------- |
| 00000014 | FILM FORMING DEVICE A | 1ST LAYER: FILM FORMING | 2007/05/12 10:00 | 38 (PIECES) | 16 |
| 00000015 | PHOTORESIST APPLICATION A | 1ST LAYER: PHOTORESIST APPLICATION | 2007/05/12 10:00 | 42 (PIECES) | 13 |
| 00000016 | EXPOSURE A | 1ST LAYER:EXPOSURE | 2007/05/12 10:00 | 21 (PIECES) | 20 |
| 00000017 | EXPOSURE B | 1ST LAYER:EXPOSURE | 2007/05/12 10:00 | 18 (PIECES) | 19 |
| 00000018 | DEVELOPMENT A | 1ST LAYER: DEVELOPMENT | 2007/05/12 10:00 | 34 (PIECES) | 13 |
| 00000019 | ETCHING A | 1ST LAYER: ETCHING | 2007/05/12 10:00 | 32 (PIECES) | 16 |
| 00000020 | PHOTORESIST REMOVAL A | 1ST LAYER: PHOTORESIST REMOVAL | 2007/05/12 10:00 | 39 (PIECES) | 21 |
| 00000021 | FILM FORMING DEVICE A | 1ST LAYER: FILM FORMING | 2007/05/12 12:00 | 38 (PIECES) | 31 |
| 00000022 | FILM FORMING DEVICE B | 2ND LAYER: FILM FORMING | 2007/05/12 12:00 | 34 (PIECES) | 16 |
| 00000023 | PHOTORESIST APPLICATION A | 1ST LAYER: PHOTORESIST APPLICATION | 2007/05/12 12:00 | 39 (PIECES) | 9 |
| 00000024 | PHOTORESIST APPLICATION A | 2ND LAYER: PHOTORESIST APPLICATION | 2007/05/12 12:00 | 12 (PIECES) | 18 |
| 00000025 | PHOTORESIST APPLICATION B | 2ND LAYER: PHOTORESIST APPLICATION | 2007/05/12 12:00 | 26 (PIECES) | 10 |
| 00000026 | EXPOSURE A | 1ST LAYER:EXPOSURE | 2007/05/12 12:00 | 20 (PIECES) | 24 |
| 00000027 | EXPOSURE B | 1ST LAYER:EXPOSURE | 2007/05/12 12:00 | 15 (PIECES) | 14 |
| 00000028 | EXPOSURE B | 2ND LAYER: EXPOSURE | 2007/05/12 12:00 | 8 (PIECES) | 16 |
| 00000029 | EXPOSURE C | 2ND LAYER: EXPOSURE | 2007/05/12 12:00 | 20 (PIECES) | 22 |
| ----- | ------- | ------------ | --------- | --------- | ------- |
| 00000099 | FILM FORMING DEVICE A | 1ST LAYER: FILM FORMING | 2007/05/14 16:00 | 17 (PIECES) | 18 |
| 00000100 | FILM FORMING DEVICE A | 2ND LAYER: FILM FORMING | 2007/05/14 16:00 | 28 (PIECES) | 12 |
| 00000101 | FILM FORMING DEVICE B | 2ND LAYER: FILM FORMING | 2007/05/14 16:00 | 12 (PIECES) | 15 |
| 00000102 | FILM FORMING DEVICE B | 3RD LAYER: FILM FORMING | 2007/05/14 16:00 | 26 (PIECES) | 9 |
| 00000103 | PHOTORESIST APPLICATION A | 1ST LAYER: PHOTORESIST APPLICATION | 2007/05/14 16:00 | 30 (PIECES) | 17 |
| ----- | ------- | ------------ | --------- | --------- | ------- |

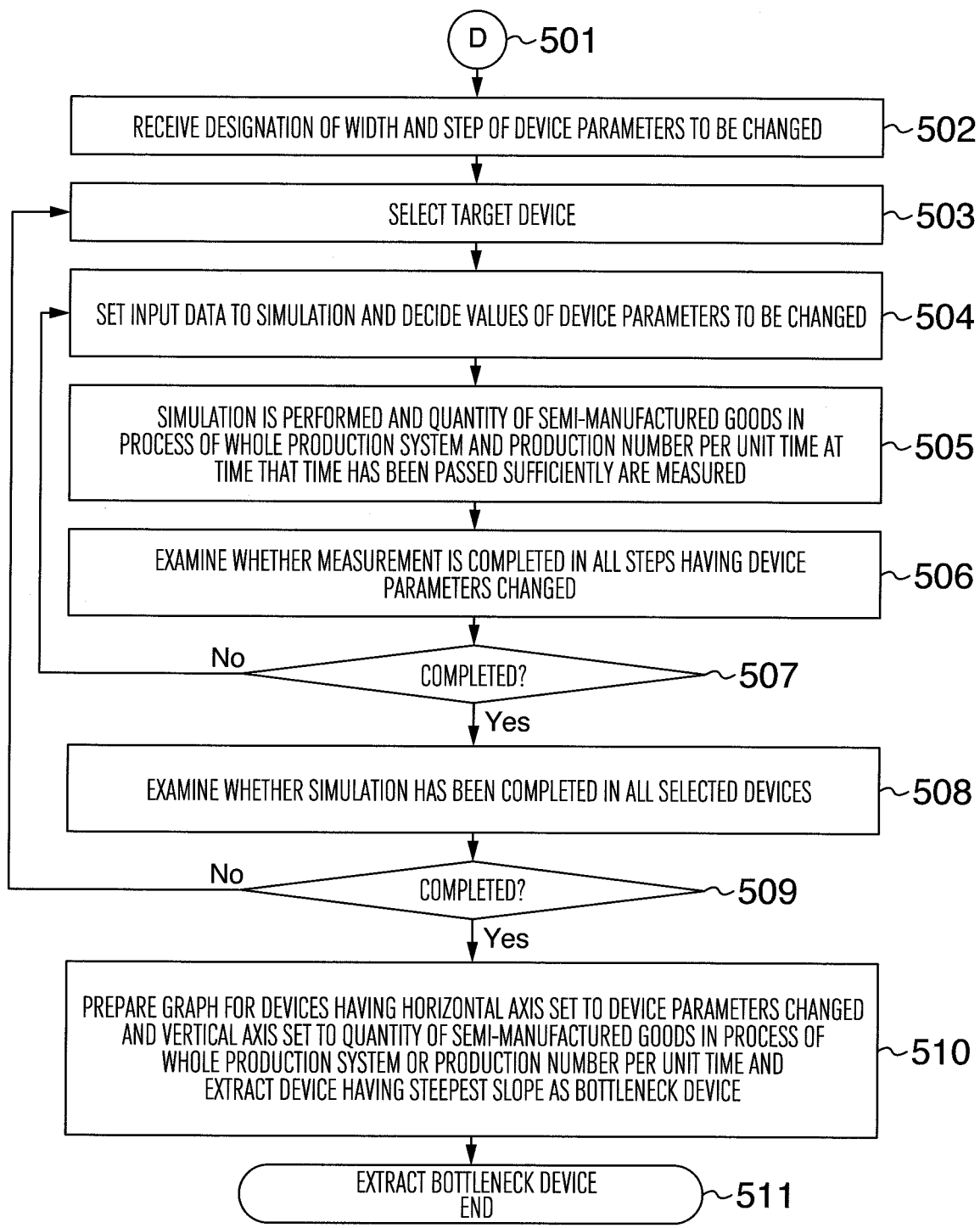

US 8,423,168 B2

BOTTLENECK DEVICE EXTRACTING METHOD AND BOTTLENECK DEVICE EXTRACTING ASSISTANCE DEVICE

INCORPORATION BY REFERENCE

This application claims priority from Japanese Patent Application No. 2007-335594 filed on Dec. 27, 2007, the content of which is hereby incorporated by reference into this application.

TECHNICAL FIELD

The present invention provides a method and system of increasing the production efficiency of a production system including a plurality of processes in respect to products such as electronic device products containing semiconductor elements, magnetic storage devices, flat displays and printed boards, industrial machine products containing automobiles, elevators and construction machinery and continuous processed products containing manufactured oil, manufactured medicine and processed food.

BACKGROUND ART

It is urgently necessary to establish the small-lot production system of a wide variety of products due to diversification of kinds and short life of the high-technology device products such as semiconductor elements, magnetic storage devices, liquid crystal devices, plasma displays and printed boards. In the manufacture at the core of the production of the high-technology device products, the work of applying photosensitive substance on a material such as wafer and glass substrate and printing out an electric circuit pattern drawn on a mask using an exposure device thereon to form a circuit pattern is repeated. In order to repeatedly form the circuit pattern, the production system takes the job shop type in which the production system includes several hundreds or more of processes and one device has a plurality of processes under its charge, each one of which is composed of a plurality of devices having the same function. Moreover, malfunctioning of one device influences the process quality in proportion to the number of lamination layers of the circuit pattern and accordingly the yield rate of products is influenced truly.

In order to establish the small-lot production system of a wide variety of products by means of such a large-scale and variable job shop type production system, it is indispensable to form the structure of continuous productivity improving activity for early specifying root cause of impeding the productivity of the production system such as quality variation of material, worker's mistake and reduction in productive capacity of device and rapidly taking measures to solve a problem.

Specifically, with regard to reduction in productive capacity of device, there is a problem that the productive capacity is changed due to Production that one machine works for multiple process and High product mix and low product volume production in addition to sudden event such as failure. For example, when the fabrication time in process P for kind A of device X is 1 hour and the fabrication time in process Q for the same kind A of the same device X is 2 hours, the productive capacities of device X for processes P and Q are 1 piece/hour and 0.5 piece/hour, respectively, which are different when the productive capacity is the production number per unit time. Furthermore, when the fabrication time for kind A of device X is 1 hour and the fabrication time for kind B of device X is 2 hours, the productive capacities of device X for kinds A and B are 1 piece/hour and 0.5 piece/hour, respectively, which are different. When the quantity of work in process (WIP) is unexpectedly changed due to cause such as variation in the yield rate, there arise (1) problem that the productive capacity of device is changed due to the multiple-process possession production and (2) problem that the productive capacity of device is changed due to High product mix and low product volume production. As described above, in the job shop type production system and the small-lot production system of a wide variety products, the problems (1) and (2) cause unexpected reduction (bottleneck) of the productive capacity of device and become productivity improvement impeding factor of the production system.

With regard to improvement of the productivity in the production system, as prior-art examples about the method of specifying the device in which the productive capacity is reduced due to the above problems (1) and (2), the following may be referred to.

Patent document 1 proposes a distribution neck diagnosis method for the job shop type manufacturing line for the purpose of estimating a bottleneck state in the production system quantitatively and specifying changing bottleneck process. This method comprises calculating a coefficient of correlation of production quantity (throughput) per unit time of each device in job shop and throughput of the whole production system and graphically representing the correlation coefficients for each device to be compared, so that a device in the bottleneck state is specified.

Patent document 2 proposes a method of monitoring throughput of a production system and its variation in real time and judging whether throughput of device is neither too much nor too little in contradistinction to the throughput of the whole production system and whether variation of the throughput is large or not. The device having problem is regarded as a bottleneck device and when there is a problem, WIP supplied to the device is limited.

Non-patent document 1 proposes a method of classifying the degree of production fluctuation for one device on the basis of analyzed arrival frequency in the queuing theory. The device classified as having large production fluctuation is defined as a bottleneck device having the productive capacity being lacking.

The CV (coefficient of variation) analysis method that is the statistical analysis method proposed in the non-patent document 1 quantifies the performance variation of one device in the production system such as change of throughput and WIP using a coefficient C. The coefficient C is calculated by dividing the standard deviation s by an average value r.

$$C = s/r \qquad \text{expression 1}$$

The coefficient C is used to classify the production fluctuation into three states including a state LV (low variability) having negligibly small variation, a state MV (moderate variability) that variation is apt to be produced and a state HV (high variability) that variation is always produced.

Patent document 1: JP-A-2004-13825
Patent document 2: JP-A-2004-503837
Non-patent document 1: Wallance. J. Hopp, Mark. L. Spreaman, Variability Basics, Factory Physics, p 248-286, Irwin Professional Pub, 1995
Non-patent document 2: Youichi Nonaka, Attila Lengyel, Kouichi Sugimoto, Monitoring Variance in Manufacturing System Performance, 40th CIRP International Seminar on Manufacturing Systems, 2007

DISCLOSURE OF THE INVENTION

The point of attention paid to the problem in the techniques disclosed in the patent documents 1 and 2 and the non-patent document 1 is the same as the present invention. All 3 documents describe the method of judging whether the device is the bottleneck device or not on the basis of the throughput of each device in contradistinction to the throughput of the whole production system. However, as described in the non-patent document 2, even when the throughput of the device is small in contradistinction to the throughput of the whole production system, the device cannot be specified as being the bottleneck device. The reason is that when the production system having a plurality of processes installed in a row is considered, the production fluctuation produced in a certain process and device influences downstream processes and devices along the row of processes and accordingly even when the throughput or WIP is directly estimated for each process and device, the productivity impeding factor cannot be specified.

Namely, it is an object of the present invention to set up a method of specifying a bottleneck device of root cause of impeding the productivity in consideration of even mutual influence among processes of production fluctuation with regard to the subject of specifying the device in which the productive capacity is reduced due to the above problems (1) and (2).

In order to solve the problem, according to the present invention, there is provided a bottleneck device extracting assistance device comprising a manufacturing line result information collection part to classify production indexes of manufacturing devices in a manufacturing line at intervals of predetermined collection time for each production process to be collected, a time-series transition preparation and display part to calculate production index for each predetermined time section and production process from the collected production indexes, to calculate moving average and dispersion for each production process while a plurality of time sections are overlapped, to calculate variation coefficient for each predetermined time section and production process, to decide form for display of the variation coefficients using predetermined threshold, to set coordinates having axes for time and process, and to display the variation coefficients at pertinent positions of the coordinates in the display form, a simulation model preparation part to receive preparation of a simulation model in which any variation of designated production index is produced in a specific manufacturing device in the manufacturing line on designated date, a production fluctuation measurement part to operate the simulation model by a simulation device and perform preparation processing of the time-series transition and display thereof on the basis of simulation result, a production fluctuation propagation length measurement part to extract an outline of two-dimensional pattern data composed of two-dimensional array elements in which variation coefficients prepared by the production fluctuation measurement part are stored and search for number of processes from most upstream process to most downstream process of two-dimensional pattern data having a series of connection relation as longest production fluctuation propagation length that production fluctuation in upstream process influences production fluctuation in downstream process, and a bottleneck device extracting part to totalize the longest production fluctuation propagation lengths of the two-dimensional pattern data gotten by the production fluctuation propagation length measurement part to be compared and specify a manufacturing device of most upstream process of two-dimensional pattern data having longest propagation length among them as a bottleneck device.

According to the present invention, a bottleneck device of root cause of impeding the productivity can be early specified in consideration of even mutual influence among processes of production fluctuation. The structure of continuous productivity improving activity in which attention is paid to a bottleneck device and measures are taken to solve problem can be formed and the productivity of the production system can be improved.

Other objects, features and advantages of the present invention will be apparent from the following description of embodiments of the present invention taken in conjunction with the accompanying drawings.

BEST MODE OF CARRYING OUT THE INVENTION

Embodiments of the present invention are now described with reference to the accompanying drawings.

Embodiment 1

(1) A Way of Thinking of a Method of Visualizing the Productive Capacity in the Production System A way of thinking in the bottleneck device extracting method of the present invention is described.

FIG. 2 illustrates WIP fluctuation due to device failure having occurred in process 1. The vertical axis of FIG. 2 represents the production system having processes 1 to 3 lined up. The horizontal axis of FIG. 2 represents the daily schedule of production from first to third days. One device is installed in each of the processes and WIP that has been processed by the device in the process 1 is send to the device in the process 2, WIP that has been processed by the device in the process 2 being sent to the device in the process 3. Each column partitioned by the process and the production day represents increased or decreased WIP. FIG. 2 shows that failure occurs in the device of the process 1 on the first day and as a result WIP in the process 1 is varied. The variation of WIP is propagated from the process 1 to the process 2 with time and to the process 3 on the third day.

Here, when a conventional method of calculating throughput and an average value of WIP during a specific term of the whole production system or a specific process on the third day to perform comparative estimation is used, it seems that root cause of impeding the productivity resides in the device of the process 3 apparently since the variation of WIP occurs in the device of the process 3. However, as described above, the root cause resides in the device of the process 1. That is, there is a problem that the production fluctuation produced in a certain process or device influences another process or device along the lined processes and accordingly it is judged that the conventional method is difficult to detect the root cause impeding the productivity.

In the present invention, the CV analysis method proposed in the non-patent document 1 is expanded and the method of visualizing the state that the production fluctuation in the production system changes with the lapse of time has been developed.

In the fabrication step, the definition expression of the coefficient C for quantifying the performance variation of one device in the production system so that even mutual influence among processes in the production system can be analyzed is expanded so that variation situation can be analyzed along the time axis.

$$r_{ia} = \frac{1}{k} \sum_{j=a-k+1}^{a} p_{ij} \qquad \text{expression 2}$$

In the expression 2, i represents a serial process number given to the first process to the last process along the process route and j represents a section number given when the operation time of the manufacturing line is partitioned by any sections (time section Ts). pij represents a production index in the process i and the time section j. The production index is throughput (production quantity) of process or device, WIP (work in process), operation rate, yield rate and the like. Namely, ria represents an average value of the production index from time sections a−k+1 to a in process i. When the time section a is changed, its sample section k is also changed and accordingly ria represents the moving average of the production index in the sample section k at time Ta (represented by the last time Ta of the time section a) in process i. In this manner, the expression is expanded to consider the time component.

Dispersion of the production index pij is as the following expression 3.

$$s_{ia} = \sqrt{\frac{1}{k} \sum_{j=a-k+1}^{a} (p_{ij} - r_{ia})^2} \qquad \text{expression 3}$$

In the expression 3, sia represents dispersion of the production index in the sample section k at time Ta in process i. That is, the coefficient Cia expanded so that the variation situation along the time axis can be analyzed is given by the following expression.

$$C_{ia} = \frac{s_{ia}}{r_{ia}} \qquad \text{expression 4}$$

Next, in order to visualize the state that the production fluctuation in the production system changes with the lapse of time, the coefficient Cia is utilized to prepare a visualization table shown in FIG. 3. In the visualization table of FIG. 3, the horizontal direction represents a row of processes from the first process to the last process along the process route and the vertical direction represents a row of times defined when time is partitioned by any sections. That is, Pi represents process i and Ta represents time section a. The coefficient Cia of the expression 4 is assigned to each column of FIG. 3 formed by combination of the process Pi and the time a (time section a).

Then, the background color of each column is changed in accordance with the coefficient Cia of the expression 4. Table 1 shows an example in case where the variation situation of the production system is classified into 3 parts in accordance with the coefficient Cia.

TABLE 1

| classification | background color | production variation |
|---|---|---|
| $c_{ia} < B_L$ | ☐ | negligible |
| $B_L \leq c_{ia} < B_U$ | ▨ | apt to occur |
| $B_U \leq c_{ia}$ | ■ | always occur |

In this example, when the coefficient Cia is smaller than a lower limit value $B_L$, this area is defined as an area where variation of the production system is negligibly small and is given a certain background color. When the coefficient Cia is larger than or equal to the lower limit value $B_L$ and smaller than an upper limit value $B_U$, this area is defined as an area where variation of the production system is apt to occur and is given another background color. When the coefficient Cia is larger than or equal to the upper limit value $B_U$, this area is defined as an area where variation of the production system always occurs and is given still another background color.

When the background colors are changed in this manner, the pattern formed of the coefficients Cia having the same background color has macroscopic meaning as shown in FIG. 4 and can represent the phenomenon of the production fluctuation moving from process to process with time, for example. In this manner, the bottleneck device extracting assistance system assists to rapidly analyze mutual influence of the production fluctuation along the time axis even for a large-scale production system.

(2) Schematic Configuration of Bottleneck Device Extracting Assistance System

FIG. 1 is a schematic diagram illustrating a bottleneck device extracting assistance system 1 to which an embodiment of the present invention is applied.

The bottleneck device extracting assistance system 1 includes a bottleneck device extracting assistance device 10, a simulation device 20 and device state and result monitors 40 which are installed in respective processes or devices on the manufacturing line to collect device states and production results and report them to the bottleneck device extracting assistance device 10, which are connected through a network 30.

The bottleneck device extracting assistance device 10 includes a control part 50, which includes a simulation model preparation part 51 which prepares a simulation model of the manufacturing line, a manufacturing line result information collection part 52 which collects manufacturing line result information reported by the device state and result monitors 40 installed on the manufacturing line and stores it in a memory part 60, a production fluctuation measurement part 53 which measures the state that the production capacity fluctuation propagates along the production route on the basis of a result of simulation in which the production capacity fluctuation in a specific manufacturing device is produced intentionally, a production fluctuation propagation length measurement part 54 which measures a propagation length of a propagation area judged that the production fluctuation occurs, a bottleneck device extraction part 55 which extracts a bottleneck device on the basis of the simulation result and a time-series transition preparation and display part 56 which prepares a time-series transition diagram of the production index from manufacturing line result information and displays it in an output part 80. Furthermore, the bottleneck device extracting assistance device 10 includes the memory part 60, which includes a production plan information memory area 61, a manufacturing line result information memory area 62, a simulation model data memory area 63, a production fluctuation measurement information memory area 64, a simulation result data memory area 65, a device setting and operation parameter memory area 66 and a kind-classified process route information memory area 67. Moreover, the bottleneck device extracting assistance device 10 includes an input part 70 constituted of an input device such as keyboard and mouse, an output part 80 constituted of a display unit such as liquid crystal display and a communication part 90 such as communication interface.

The simulation device 20 prepares a simulation model of the manufacturing line and production process in the computer and simulates dynamic process in the model, so that various productivity indexes classified by product/kind, process, manufacturing device and the like are outputted, for example. It is predicted that the precision of the simulation result differs depending on information of the real thing considered in the model and accuracy, although in the present invention it is supposed that a simulation system of an existing simulator is utilized without specifying it. However, when the simulation model is prepared, the simulation model having input specifications peculiar to the present invention and data inputted in accordance with the input specifications can be executed. In FIG. 1, the simulation device 20 is realized as a device different from the bottleneck device extracting assistance device 10, although there is also considered the realization form in which the function of the simulation device 20 is incorporated into the bottleneck device extracting assistance device 10.

The device state and result monitors 40 fulfils the function of collecting and reporting production indexes such as distribution situation and production results of the manufacturing line, although the device state and result monitors 40 may be installed in a corresponding manner to a plurality of manufacturing devices for each of manufacturing processes or may be installed to be connected to each of manufacturing devices individually, for example. The production index for each of manufacturing devices may be automatically collected at intervals of predetermined period or may be reported by operator's input of the manufacturing device from a terminal connected.

(3) Results Information Collection Processing of Production Indexes of Manufacturing Line Initial setting information for collecting the production indexes of the manufacturing line is inputted from the input part 70 of the bottleneck device extracting assistance device 10. The initial setting information contains the kinds of the production indexes to be collected, frequency of collection and collection time. The initial setting information inputted by the user is stored in the device setting and operation parameter memory area 66 of the memory part 60. Further, the inputted initial setting information is notified to the device state and result monitors 40.

The bottleneck device extracting assistance device 10 collects result information (result value of designated production index) of the manufacturing devices from the device state and result monitors 40 installed in the manufacturing line in accordance with the set information such as collection frequency and collection time and stores it in the manufacturing line result information memory area 62 of the memory part.

Referring now to FIG. 5, processes in case where the manufacturing line is semiconductor pre-fabrication process, for example, is described in brief. A wafer fabrication process is process in which a disk-shaped substrate made of silicon or glass is supplied and pattern and elements of an electronic circuit are formed on the substrate. In substrate supply process, a substrate of a target is supplied (S11). Next, oxidation film is formed on the surface of the substrate in "film forming" process (S12). Further, in "photoresist application" process, material (photoresist) of which only part irradiated with light in order to transfer pattern of circuit and element structure thereto is chemically changed is applied on the oxidation film (S13). Next, in "exposure" process, the substrate is irradiated with light through a glass substrate named a photomask having circuit and element structure depicted thereon, so that the circuit and element structure are transferred thereto (S14) and then in "development" process, the substrate is dipped into developing solution to remove photoresist which is not chemically changed (S15). Thus, the photoresist having the same pattern as the circuit and element structure depicted on the photomask is left on the substrate. Next, in "etching" process, the oxidation film which is not covered by the photoresist and is exposed on the substrate is removed using medical fluid and gas (S16) and then in "photoresist removing" process, the photoresist is removed to form the pattern of the circuit and element structure desired to be produced (S17). Generally, in the wafer fabrication process, in order to form the circuit having a plurality of layers, the above processes are repeated several or several ten times to form complicated circuit and element structure. After the circuit and element structure are formed on the substrate, judgment as to whether the circuit and element structure are good or bad is performed in "inspection" process (S18) and the substrate is outputted (S19).

The manufacturing line result information collection part 52 of the bottleneck device extracting assistance device 10 collects the production index values designated by the user from the device state and result monitors 40 installed in the wafer manufacturing line for each manufacturing device and/or for each process at the frequency of the time interval (data collection time section) Tg designated by the user and stores the collected production index values in the manufacturing line result information memory area 62 of the memory part while classifying them into data tables for product (kind) name and production index as shown in FIG. 6. In the embodiment, the time interval (data collection time section) Tg designated by the user in the result information collection processing is set to 2 hours and the data collection time is set to every 2 hours such as 10:00, 12:00, 14:00 and 16:00. Information reported by the device state and result monitors 40 is information of the results of the production indexes of manufacturing devices collected and reported at intervals of 2 hours. Information at data collection time 10:00 is result value of the production index of each manufacturing device during the period of 08:00 to 10:00. However, when the stop time such as nighttime exists in the operation time of the manufacturing line, the information reported at data collection time 10:00 is information for the time period of 2 hours obtained by adding the result value of the production index during the period of 09:00 to 10:00 in case where the operation beginning time on one day is 09:00 to the result value of the production index for the last one hour on the previous day. Moreover, event information that the manufacturing device is stopped at night is also reported.

The manufacturing line result information collection part 52 receives report of result values of the production indexes of all the manufacturing devices at data collection time and stores them in the data table shown in FIG. 6 for each of product (kind) names and production indexes. The manufacturing line result information 62 is recorded in the data record format having at least data ID, manufacturing device name, process name, data collection date and production index collection result value as data items. In an example of FIG. 6, the product (kind) name is ASIC2007, the production index is result information of throughput (production quantity), and the production index collection result value is the number of wafers.

(4) Time-Series Transition Preparation and Display Processing of Manufacturing Line FIG. 8 is a flow chart showing display processing of the production fluctuation visualization table of the manufacturing line.

The user of the bottleneck device extracting assistance device 10 instructs to prepare the production fluctuation visualization table of the manufacturing line in a row of processes conforming to the manufacturing route from the first process to the last process of a certain product (kind) name. The time-series transition preparation and display part 56 is started in response to the instruction and receives user's input containing product (kind) name, production index, sample section k for calculating a moving average of the production index and target term (start day/start time To and end day/end time Te) for displaying the production fluctuation of the manufacturing line from the input part 70 (S801). The sample section k represents the number of time sections defined along the time axis in which result values of the production indexes to be calculated are collected when the moving average of result values of the production indexes of the processes is calculated and corresponds to the number of time sections Ts by which the operation time of the manufacturing line is partitioned as described above. In the embodiment, the time section Ts is equal to the time interval (data collection time section) Tg designated by the user and accordingly is 2 hours. For example, when the sample section k is designated to be 2, the time interval is represented by 2×Ts and the moving average of result values of the production indexes for 4 hours is calculated. Moreover, in order to specify a certain time section Ts on time axis, the time section Ts is represented by the last time Ta of the time section Ts. That is, the sample section k of a certain time section Ts represents time during the period from time Ta−k×Ts to time Ta.

The time-series transition preparation and display part 56 reads out process route information 67 for each product (kind) stored previously in the memory part 60 (S802). The kind-classified process route information 67 is classified for each product (kind) name as shown in FIG. 7 and is constructed as a data table having data items of process NO(i) and process name and in which all processes including from supply of material (wafer or the like) to completion of product are registered.

Next, the time-series transition preparation and display part 56 reads out the manufacturing line result information 62 corresponding to the designated product (kind) name, product index and target term displaying the production fluctuation (S803). Time Ta representing first time section Ts of the vertical axis of the production fluctuation visualization table is initially set to Ta=start day/start time To of the target term+k×Ts in accordance with the designated display target term (start day/start time To and end day/end time Te) and the sample section k (S804) and calculation processing in the following steps is repeated. The variables Ta, To and Te defined here are variable containing information of year, month and day.

The time-series transition preparation and display part 56 reads out pertinent data record produced by collecting the production indexes during the period from time Ta−k×Ts to time Ta from the read-out manufacturing line result information 62 and totalizes the production index collection result values having the process name of the same data record for each time section (time section number j) to calculate the process-classified and time-section-classified production index pij. Here, i represents the process NO read out from the kind-classified process route information and j represents the number given to each time section Ts continued after the time section having the time section number of k where k is the time section number for the time section Ts represented by an initial value of time Ta designated by start day/start time To+k×Ts of the target term. The moving average ria of the production index in sample section k at time Ta (time section number a) of the process i is calculated by the following expression 5 (S805).

$$r_{ia} = \frac{1}{k} \sum_{j=a-k+1}^{a} p_{ij} \qquad \text{expression 5}$$

Next, dispersion sia of the process-classified and time-section-classified production index $p_{ij}$ in the sample section k at time Ta (time section number a) of the process i is calculated by the following expression (S806).

$$s_{ia} = \sqrt{\frac{1}{k} \sum_{j=a-k+1}^{a} (p_{ij} - r_{ia})^2} \qquad \text{expression 6}$$

Next, variation coefficient Cia in the sample section k at time Ta (time section number a) of the process i is calculated by the following expression 7 (S807).

$$C_{ia} = \frac{s_{ia}}{r_{ia}} \qquad \text{expression 7}$$

Next, the background color in the production fluctuation visualization table is decided in accordance with the calculated values of the variation coefficients Cia. The values $B_L$ and $B_U$ in Table 1 used for the decision are decided while the threshold for judging that the production fluctuation is negligibly small and the threshold for judging that variation always occurs are changed in accordance with the policy of productivity improvement activity and situation. In the embodiment, it is supposed that the distribution of the production index is the normal distribution and the values shown by the variation coefficient at the boundary of ±standard deviation from the average value are adopted to be set to $B_L$=0.75 and $B_U$=1.33. The background colors of the variation coefficients are decided in accordance with judgment expressions of Table 2 to be recorded (S808).

TABLE 2

| classification | backgroud color | production variation |
|---|---|---|
| $c_{ia} < 0.75$ | ☐ | negligible |
| $0.75 \leq c_{ia} < 1.33$ | ▨ | apt to occur |
| $1.33 \leq c_{ia}$ | ■ | always occur |

Time Ta and time section number j for next time section are updated (S809). When the updated time Ta is past the end time Te of the display target term, the above processing is ended and the processing proceeds to next step (S810). When the time Ta is not past the end time Te of the display target term, the processing is returned to step S805 and a series of calculation processing is repeatedly performed in order to estimate the variation of the production index at updated time Ta and new time section represented by time section number j.

Next, the production fluctuation visualization table is displayed or outputted to the output part on the basis of the results calculated by the above processing steps in accordance with information of product (kind) name, production index, sample section k and target term displaying production fluctuation of manufacturing line designated by the user (S811).

(5) Analysis Example of Production Fluctuation Visualization Table

The production fluctuation visualization table is displayed as shown in FIG. 4, for example. FIG. 9 shows an example in which the present invention is applied to the manufacturing line of the semiconductor pre-fabrication process of the jop shop type having several hundreds of processes. The horizontal axis represents a row of processes conforming to the manufacturing route from the first process to the last process of a certain product and the vertical axis represents time axis (time section Ts=1 day) of day unit in manufacture. The production index indicated by factor pij of the variation coefficient Cia is date throughput for each process.

In FIG. 9, events of stop and resumption of the manufacturing line based on the factory operation calendar are contained and its implementation day is shown by 'H' in FIG. 9. Some patterns formed by the variation coefficients Cia on the basis of the definition of Table 2 can be read. Particularly, some patterns shown by arrows X depicted from upper left to lower right in FIG. 9 are formed like long, narrow islands extending from a certain process to backward processes with the lapse of time with the implementation day of stop and resumption of the manufacturing line of 'H' in FIG. 9 as starting point. The islands can be presumed to be caused by the fact that stop and resumption processing of the devices in some processes does not advance according to plan and its influence appears as the production fluctuation of the date throughput for each process in stop and resumption processing of the manufacturing line. It can be presumed that the reason that the long, narrow islands are formed is that the production fluctuation is propagated with the lapse of time from the process at the starting point to the backward processes.

(6) Simulation Model Preparation Processing

It has been shown in the preceding paragraph that the fact that the production fluctuation caused by device failure or the like generated in the process at the starting point propagates to backward processes with the lapse of time can be read as a group of patterns having large variation coefficients Cia from the production fluctuation visualization table. The object of the present invention is to provide technique of assisting to preferentially detect the process of the root cause which is judged to influence reduction of the throughput of the whole manufacturing line more seriously and take measures earlier. Accordingly, there is provided the following function of assisting to detect process candidates deemed to be the root cause to which measures are taken by the user while looking at the production fluctuation visualization table displayed and early specify the process of the root cause to which measures are to be taken with top priority among bottleneck processes so that measures are taken swiftly.

In the present invention, production capacity fluctuation of each of devices for the candidates of bottleneck processes is produced intentionally in the simulation device and propagation of the production capacity fluctuation along the production route is simulated.

Even if any existing (semiconductor) manufacturing line simulator is used as the simulation device 20 of FIG. 1, the object of the present invention can be achieved although there is difference in accuracy and processing time. However, it is necessary to add the input specifications peculiar to the present invention and data model management function.

The simulation model preparation part 51, the production plan information memory area 61 and the simulation model data memory area 63 of the bottleneck device extracting assistance device 10 are constituent elements shared with the simulation device 20 and may be provided on any side of both devices, although in the embodiment they are provided on the side of bottleneck device extracting assistance device 10.

The simulation model preparation part 51 of the bottleneck device extracting assistance device 10 assists the user in collection of information (product information, process information, manufacturing device information and process flow) necessary for modeling of the manufacturing line and guide display of modeling in advance of execution of simulation. The simulation model preparation part 51, when started, reads out the kind-classified process route information 67 shown in FIG. 7 in accordance with the inputted product information (product name and kind name) and displays a simulation model of all processes of the manufacturing line as shown in FIG. 12. The simulation model preparation part 51 displays an icon for inputting to define the capacity of buffer Bi and an icon for selecting a manufacturing device Mi and inputting to define capability thereof in accordance with process name for each process. The user clicks the icons on the simulation model of the displayed manufacturing line and selectively inputs information of the buffers and the manufacturing devices in accordance with guide, for example. Arrows connecting routes between processes contain arrows which are previously displayed by the system in accordance with the kind-classified process route information 67 and arrows which are additionally inputted by the user on the displayed screen so as to designate the route between the processes.

The simulation model preparation part 51 prepares simulation model data in accordance with the information inputted selectively by the user. The simulation model shown in FIG. 11 is prepared by adding data items peculiar to the present invention with reference to a simulation model in a known simulator of an example and the present invention is not necessarily limited to the data record format of FIG. 11.

The simulation model preparation part 51 prepares product data record 1110 in accordance with product information. Data item "kind-classified process route information" 1113 of the product data record stores therein a pointer to kind-classified process route and manufacturing device information 1401 (refer to FIG. 14) prepared by inputting the production quantity per unit time for each manufacturing device by the user on the basis of a totalized value of the production index collection result value for each of manufacturing device names and process names from manufacturing line result information 601 and kind-classified process route information of the kind-classified process route information memory area 67. The kind-classified process route and manufacturing device information 1401 is stored in the simulation model data memory area 63. Data item "work in process file" 1111 stores therein a pointer to data item "process-classified buffer" 1141 of stocker data record 1140 defining process-classified buffers of the simulation model of the manufacturing line shown in FIG. 12. Data item "process to be used" 1112 stores therein a pointer to a group of data records from the first process to the last process with regard to process data record 1120 defining fabrication in each process. Data is stored in other data items by the user.

Process data record 1120 has data record prepared for each fabrication of one process. Data item "manufacturing device name to be used" 1121 stores therein a pointer to manufacturing device data record 1130 defining manufacturing device used in the processing.

The manufacturing device data record is defined for each manufacturing device to be prepared. Data item "dispatch rule" 1131 defines the rule as to which lot is selected from waiting lots. Data item "load rule" 1132 defines load rule to device or rule in case where one or more lots can be processed at a time. Data item "set up rule" 1133 defines rule as to what time the setting up of device is performed and the rule is to set up the device when a kind different from one used so far is supplied or when the specifications are different. Data item "work in process file" 1134 stores therein a pointer to a storage area 1141 of buffer corresponding to process born by the manufacturing device described in the manufacturing device data record. Data item "production index variation initial information" stores therein information peculiar to the present invention and set when production index variation is given to a specific manufacturing device intentionally to simulate the manufacturing line.

The simulation model preparation part 51 presents the production index variation initial information setting picture shown in FIG. 13 to the user in advance of the simulation processing and receives an input of setting initial information for producing the production index variation intentionally. The user can input to set which production index is varied or changed in which manufacturing device at what time with any waveform from a pull-down type selection menu by means of tool provided by the system. FIG. 13A shows an example in which input is made to produce variation that the production number (throughput) per unit time is reduced from 34 wafers per hour to 18 wafers per hour in the film forming device B during the period from 22:00 on December 1 to 02:00 on December 2. FIG. 13B shows an example in which input is made to produce variation that the operation rate per unit time is reduced from 100% to 38% during the period from 10:00 to 11:00 on December 5 in the manufacturing device: exposure C and then is recovered until 12:00. Waveform having any shape supported by the tool provided by the system can be inputted in addition to the stepped or nearly linear waveform inputted above.

The simulation model preparation part 51 receives the production index variation initial information inputted by the user and stores it in data item "production index variation initial information" 1135 of the manufacturing device data record 1130 of the simulation model data 63. The production index variation initial information 1135 stores therein information as to what waveform of production fluctuation of a certain production index kind is produced in the manufacturing device during the period from one date to one date.

(7) Production Fluctuation Measurement Processing by Simulation

After preparation of the simulation model, the production fluctuation measurement part 53 requests the simulation device 20 to perform simulation in which it is supposed that production capacity fluctuation occurs in a specific manufacturing device intentionally and receives the simulation result from the simulation device 20 to be stored in the simulation result data memory area.

The user displays the production fluctuation visualization table (FIG. 9) prepared from the result information 601 of the manufacturing line to be estimated and specifies a cell of (process i and time section a) doubted to be the bottleneck process. For example, candidates of the bottleneck process is selected in a circular area depicted at starting point of the arrow shown in FIG. 9 and cells of (process i and time section a) of any number are specified by click operation of mouse, for example. The bottleneck candidate cells (process i and time section a) specified by the user are stored in the simulation model data memory area 63 and the simulation model data is prepared for the bottleneck candidate cells to perform the simulation processing.

The simulation device 20 receives instruction of simulation execution from the production fluctuation measurement part 53 and reads out the pertinent simulation data from the simulation model data memory area 63, so that behavior of all of manufacturing devices, workers, objects to be processed, conveying devices and the like of the manufacturing line is simulated at intervals of predetermined simulation unit time in accordance with production plan information 1001 (refer to FIG. 10) and various productivity indexes for product/kind, fabrication, process and manufacturing device in each unit time are produced.

The bottleneck device extracting assistance device 10 of the present invention receives the simulation value of the designated production index and the quantity of work in process regarded as being stayed in the buffer for each manufacturing device and process as the simulation result data from the simulation device 20 at the frequency of the time interval (data collection time section) Tg designated when the manufacturing line result information is collected, for example, on the same date as the data collection date and stores it in the simulation result data memory area 65. The simulation result data 1501 is stored in data table for each product (kind) name and production index as shown in FIG. 15, for example. The range of the time axis of the simulation result data 1501 is set by designating the simulation target term (start date Tss and end date Tse) by the user at the time of simulation and attaching data ID to the data during the term. "Simulation result collection date" represents the last time of the time section Ts and represents that the simulation result at the time has been reported. "Simulation production index value" represents production index value manufactured within the time section Ts represented by the "simulation result collection date" in the manufacturing device. Furthermore, "quantity of buffer in process" represents the quantity of work in process before the process on the "simulation result collection date".

The production fluctuation measurement part 53 performs the same processing as the processing of displaying the production fluctuation visualization table of the manufacturing line shown in FIG. 8. The calculated variation coefficient Cia is stored in two-dimensional array S(i,j) [i represents process number and j represents time section number]. Moreover, when variation coefficients Cia are classified by thresholds in order to decide Cia background colors, ternary values of 0, 1 and 3, for example, are stored in two-dimensional array T(i,j) [i represents process number and j represents time section number] instead of Cia values. The above two-dimensional arrays are used in the following processing. FIG. 16 shows a display example of simulation result visualization table.

(8) Bottleneck Device Extracting Process

The simulation result visualization table of FIG. 16 is a result of simulation in which the production index variation shown in FIG. 13 is given to the manufacturing device at the process corresponding to the cell of (process Pi and time Ta [time section a]) intentionally and behavior of the manufacturing line is simulated. The last time of the waveform variation of the production index defined in FIG. 13 is made to correspond to the time Ta in principle.

In the simulation result visualization table of FIG. 16, the state that the production index variation produced in a cell of (process Pi and time Ta) propagates to succeeding processes is shown. According to the Inventor's analysis of the manufacturing line result information, it has been found that reduction in productive capacity of the manufacturing line is influenced larger to the extent that the phenomenon that the production index variation produced in a certain process propagates to succeeding processes farther can be confirmed. Accordingly, as a scale of specifying the bottleneck device, the processing of measuring a process length from the process (device) in which production fluctuation occurs to the most downstream process (device) influenced by the production fluctuation as a production fluctuation propagation length is adopted.

The processing of measuring the production fluctuation propagation length by the production fluctuation propagation length measurement part 54 while using the two-dimensional array S(i,j) or T(i,j) as a target to be processed is described on the simulation result visualization table of FIG. 16. Pattern in the form of long, narrow island having cells of $1.33 \leq cia$ extending in a row and starting from the cell of (process Pi and time Ta) of FIG. 16 is to be tracked. A straight line extending from the center point of the cell of (process Pi and time Ta) of FIG. 16 with an inclination $\alpha_0$ from the vertical axis represents a straight line of standard LT. That is, it represents the standard LT obtained by averaging the lapse of time required when an object to be processed is processed through all processes by a plurality of objects to be processes.

A tracking boundary angle of an island pattern according to the average operation policy of the manufacturing line defined by the following expression 8 is presented by $\delta$.

$$\text{Tan } \delta = (\text{fabrication capability of manufacturing device based on production plan})/(\text{maximum capability of manufacturing device}) \quad \text{expression 8}$$

where the "capability" means the fabrication quantity of objects to be processed per unit time of the manufacturing device.

The cells having $1.33 \leq cia$ forming the island pattern existing in the area positioned between tracking boundary lines having angles $\pm\delta$ from the center line of the standard LT are tracked. The tracking method adopts the following method, for example.

In an example of 9 cells shown in FIG. 18A, cells judged to be connected to a center cell a are 8 cells surrounding the center cell a (connection relation with 8 neighboring cells). The processing of tracking the boundaries of long, narrow island pattern composed of cells extending in a row and having $1.33 \leq cia$ and the connection relation maintained is defined. The start point of the tracking is a cell of (process Pi and time Ta). As shown in FIG. 18B, when the cell of (process Pi and time Ta) is a center cell a, cells having the numbers [1], [2] and [3] are examined in order. Cells satisfying the condition that $1.33 \leq cia$ and at least partial area of cell is contained in the area positioned between both the tracking boundary lines are judged to be cells of boundary. In an example of FIG. 18B, a cell of [1] does not satisfy the condition of $1.33 \leq cia$ and accordingly judgment proceeds to a next cell of [2]. The next cell of [2] satisfies both the conditions that $1.33 \leq cia$ and at least partial area of the cell is contained in the area positioned between both the tracking boundary lines and accordingly the cell is judged to be the cell of boundary.

Next, as shown in FIG. 18C, when the cell judged to be the cell of boundary by the tracking of FIG. 18B is set to be a center cell b, the cell a at the start point of tracking is set in upper left position. In searching for the next cell of boundary, cells are successively examined from the cell of [1] of the next connection position clockwise from the cell b toward the cell a. Cells of [1] and [2] do not satisfy the condition of $1.33 \leq cia$ and accordingly judgment proceeds to a next cell of [3]. A cell of [3] satisfies the condition and accordingly the cell is judged to be the cell of boundary. Next, as shown in FIG. 18D, when the cell judged to be the cell of boundary by tracking of FIG. 18C is a center cell c, the preceding cell b of boundary is set in left position. In searching for the next cell of boundary, cells are successively examined from the cell of [1] of the next connection position clockwise from the cell c toward the cell b. Cells of [1], [2], [3] and [4] do not satisfy the condition of $1.33 \leq cia$ and accordingly judgment proceeds to a next cell of [5]. Since the cell of [5] satisfies the condition, it is judged to be the cell of boundary.

As described above, when the tracking processing of the cells of boundary is continued, the call at beginning is given [1] and the cells are given numbers in order that the cells are judged to be the cell of boundary, so that the cell of boundary of [13] is extracted. When the tracking is further continued, the cell of [2] is given [14] and the cell [1] at beginning is coincident with cell [15]. As described above, when the tracking processing of the cells of boundary is continued and the cell at beginning is reached finally, the tracking processing is ended. In the tracking processing, when one of the duplicated cells of boundary is recorded, 13 boundary cells are extracted in an example of FIG. 18E. The cell given [7] among these boundary cells is the process positioned most downstream from the process of the start cell [1].

Then, the production fluctuation propagation length measurement part 54 performs the processing of tracking the island pattern existing more downstream. Expansion processing of island pattern in which it is considered that the production fluctuation is expanded to 8 surrounding cells when each of the 13 extracted boundary cells is positioned in the center of FIG. 18A is performed. However, only the cell of which at least part is contained in the area positioned between both the tracking boundary lines becomes the expansion cell.

FIG. 19A shows the island pattern having the cells expanded by performing the expansion processing to the 13 extracted boundary cells. The expanded cells are shown by meshes. Then, the production fluctuation propagation length measurement part 54 performs the tracking processing of the boundary cells to the expanded island pattern while considering the expanded cells as cells satisfying the condition of $1.33 \leq cia$ again. Its result is shown in FIG. 19B. In the example of FIG. 19B, there is shown that cells of boundary given the number until [20] are extracted. As a result, as compared with the last tracking processing of the boundary cells, it is understood that the cells from [10] are connected to a new island pattern except that the expanded cells are extracted as the boundary cells and the boundary is tracked. In this manner, the boundary cells of the expanded island pattern are extracted. The most downstream process is the cell given [12] among all boundary cells of the expanded island pattern.

When the tracking process of the boundary cells is performed to the island pattern having the expanded cells added thereto again, it is judged that there is not any other process influenced by the production fluctuation in the downstream processes if a new cell is not extracted except the expanded cells of the boundary cells and the cell given [7] in the boundary not subjected to the expansion processing is judged to be the most downstream process from the process of the start cell [1], so that the production fluctuation propagation length measurement is ended.

When a new cell is extracted except the expanded cells of the boundary cells as shown by the example of FIG. 19B if the tracking process of the boundary cells is performed to the island pattern having the expanded cells added thereto again, the expansion processing is performed to all of newly extracted boundary cells and the tracking processing of the boundary cells is performed to the island pattern having the expanded cells added thereto again to search for the process influencing the downstream production fluctuation.

The production fluctuation propagation length measurement part 54 judges completion of the tracking processing of the boundary cells of the island pattern and selects the boundary cell considered as the most downstream process from the process of the start cell [1] while returning to the boundary not subjected to the expansion processing. The number of processes between the selected process and the process of the start cell [1], containing processes at both ends, is decided as the production fluctuation propagation length.

FIGS. 17A and 17B are flow charts showing the processing of measuring the production fluctuation propagation length as described above.

In the embodiment, space in which the island pattern is separated is filled up by performing the expansion processing of the boundary cell once and the connection relation of pattern is complemented to perform the tracking processing of the boundary cell. However, it is considered that the expansion processing of the boundary cell is performed plural times in accordance with the degree of separation of the island pattern to complement the connection relation of pattern so that the tracking processing of the boundary cell is performed.

The bottleneck device extracting device 55 totalizes results calculated by the production fluctuation propagation length measurement part 54 of the production fluctuation propagation length on the basis of the production fluctuation visualization table prepared by the production fluctuation measurement part 53 from the simulation result data obtained by giving the production index variation to a specific manufacturing device of the manufacturing line intentionally. It is judged that the process bringing the longest production fluctuation propagation length is the bottleneck process exerting greatest influence on reduction in the productive capacity of the manufacturing line. The manufacturing device used in the bottleneck process is confirmed from the manufacturing line result information 601 and the simulation result data 1501 to be judged as the bottleneck device. The judgment result is comparatively displayed as shown in an output example 115 of FIG. 20, for example, with a graph of the production fluctuation propagation length for devices subjected to the simulation, so that the bottleneck device is specified.

Embodiment 2

FIG. 20 is a diagram illustrating the features of the production system (101) of a target and primary measures of the present invention thereto. The production system (101) includes 6 processes from process 1 (102) to process 6 (103) and each process includes a plurality of devices such as device 1a (104). The production system (101) produces products A (105) and B (106) and to this end semi-manufactured goods (107) for the product A and semi-manufactured goods (108) for the product B are supplied to the product system (101). The production route of the product A (105) is processes 1, 3 and 5 or 6. The product route of the product B (106) is processes 2, 4, 2, 4 and 5 or 6. Particularly, the processes 2 and 4 are passed twice in the product route of the product B (106).

At this time, it is understood that devices 2a (110) and 4a (111) take charge of two processes in the production route of the product B. This is named Production that one machine works for multiple process. When the yield is reduced unexpectedly upon passing through the devices 2a (110) and 4a (111) for the first time, the productive capacity of the devices 2a (110) and 4a (111) is increased by part corresponding to the reduction upon passage for the second time. Since the processing times for the first and second times are different, throughputs of the devices 2a (110) and 4a (111) for the first and second times are varied. Namely, there is a problem that the productive capacity of the device is changed due to the multiple-process possession production.

It is understood that device 5b (109) is supplied with semi-manufactured goods from the processes 3 and 4 and must deliver the products A (105) and B (106). This is named High product mix and low product volume production. When the yield is reduced in the device 3a (112) unexpectedly, the number of receivable products in process from devices 3b (123) and 4a (111) is increased by part corresponding to the reduction. Since the processing times for the semi-manufactured goods (107) for the product A and the semi-manufactured goods (108) for the product B in the device 5b (109) are different, the throughput of the device 5b (109) is changed due to reduction in supply quantity from the device 3a (112) and increase in supply quantity from the device 4a (111). Namely, there is a problem that the productive capacity of device is changed due to High product mix and low product volume production.

Namely, the productive capacity of device is reduced (bottleneck) unexpectedly due to (1) the problem that the productive capacity of device is changed due to Production that one machine works for multiple process and (2) the problem that the productive capacity of device is changed due to High product mix and low product volume production. The object of the present invention is to form the structure of continuous productivity improving activity for early specifying the bottleneck device and rapidly taking measures to solve a problem.

In order to achieve the above object, in FIG. 20, the present invention is used to describe the method of intentionally generating production capacity fluctuation in each device in the simulation system, calculating how the production capacity fluctuation propagates along the production route, comparing the propagation lengths for each device and extracting the device having the longest propagation length as the bottleneck device. Detailed description thereof is now made with reference to FIG. 20.

A simulation system (113) has production fluctuation measurement function (114) and bottleneck extracting function (115) and previously stores therein a numerical model of the production system (101). The numerical model contains production quantity per unit time for each kind, productive quantity and failure time per unit in each device in the production system, number of work in process for each process of semi-manufactured goods such as semi-manufactured goods (107) for product A and semi-manufactured goods (108) for product B in addition to process route for each kind such as products A (105) and B (106).

The production fluctuation measurement function (114) utilizes the numerical model and includes a production fluctuation display table (118) having production times (116) of the production system (101) and enumerated devices (117). The production fluctuation display table (118) can display the state that production fluctuation of each device propagates to other devices and accordingly parameters of respective devices are changed intentionally (119) to display the state that the production fluctuation propagates to other devices (120). The process length from the device in which production fluctuation is generated to the most downstream device influenced thereby is measured as production fluctuation propagation length (121). In FIG. 20, when parameters of the device 1a are changed intentionally, the state that its influence propagates to device 6a is shown and the process length from device 1a to device 6a is measured as the production fluctuation propagation length (121).

The bottleneck extracting function (115) ranks the production fluctuation propagation lengths (121) measured by the production fluctuation measurement function (114) and extracts the device having the longest propagation length as the bottleneck device. In FIG. 20, the device 2a has the longest production fluctuation propagation length (122) and accordingly the device is extracted as the bottleneck device.

The invention described in the embodiment 2 can be realized by measures of the invention described in the embodiment 1. Difference between both the inventions resides in that manufacturing devices used in processes are arranged in the horizontal axis of the production fluctuation display table of the embodiment 2. Accordingly, data processing is performed in unit of process in the embodiment 1, whereas the data processing is performed in unit of device in the embodiment 2.

FIG. 21 is a diagram illustrating the method of investigating how the quantity of semi-manufactured goods in process of the whole production system or the production number per unit time is changed while changing parameters such as the failure rate of each device or the production quantity per unit time in the simulation system using the present invention for the purpose of the above problems (1) and (2) so that the bottleneck device is extracting.

A production system (201) to be examined in FIG. 21 is the same as the production system (101) to be examined in FIG. 20. A simulation system (205) has production fluctuation measurement function (203) and bottleneck extracting function (204). In the production fluctuation measurement function (203), a correspondence table of failure rates (202) and devices (211) is prepared and the failure rate is changed from 0.01 to 0.08 at intervals of 0.01 in each device (211) to perform simulation in each failure rate, so that when the production time in the simulation has passed sufficiently, the quantity of semi-manufactured goods in process of the whole production system or the production number per unit time is measured. The device parameters to be changed contain the production quantity per unit time and the like in addition to the failure rate (202) of FIG. 21. The bottleneck extracting function (204) graphically represents the quantity of semi-manufactured goods in process of the whole production system or the production number per unit time when the failure rate (202) is changed by the devices (211) measured by the production fluctuation measurement function (203). That is, the value of device parameter (in FIG. 21, failure rate) varied intentionally (201) is set to the horizontal axis and the quantity of semi-manufactured goods in process of the whole production system or the production number per unit time (206) is set to the vertical axis, so that simulation result (207) concerning the device 2a, simulation result (208) concerning the device 1a, simulation result (209) concerning the device 1b and the like are represented graphically. The device having the largest quantity of semi-manufactured goods in process of the whole production system, the most remarkable increasing tendency of the quantity of work in process, the smallest production number per unit time or the most remarkable reduction tendency of the production number per unit time is extracted as the bottleneck device.

FIG. 22 is a flow chart showing the bottleneck device extracting method of the present invention described in FIGS. 20 and 21. When the bottleneck device extracting step (301) is started, data of kind-classified process route, kind-classified production quantity per unit time, production quantity and failure time per unit time of device and number of process-classified work in process are inputted (302). Next, user's selective designation as to whether the device in which production fluctuation is produced is selected is received (303). When it is selected (304), user's designation of the device in which production fluctuation is produced is received (306). When it is not selected (304), production fluctuation is produced in all devices (305). User's selection for the following case is received to separate the cases where device parameters are changed in order to produce production fluctuation (307).

Case A: Device parameters are changed on the way of production to observe the transition state of production fluctuation.

Case B: Processing that device parameters are changed from the start and the state of the production system is observed when time has passed sufficiently is observed while device parameters are changed.

When the case A is selected (308), the processing proceeds to step C (309). When the case B is selected, the processing proceeds to step D (310).

FIG. 23 is a flow chart continued from the step C in the flow chart of FIG. 22. The flow chart illustrates the production fluctuation measurement function (114) and the bottleneck extracting function (115) of FIG. 20. After step C (401), the device to which attention is paid in the simulation this time is decided and input data is set to the simulation (402). Simulation is performed and parameters of device to which attention is paid are changed intentionally to generate production fluctuation (403). Production fluctuation in each device at each time is extracted and simulation result as to which device in downstream process the production fluctuation caused by influence of the device having the parameters changed reaches is investigated and the length thereto is regarded as the production fluctuation propagation length (404). Thereafter, it is examined whether the simulation has been completed in all the selected devices (405). When not completed, processing is returned to step (402). When completed (406), the device for the simulation result having the longest production fluctuation propagation length is extracted as the bottleneck device (407) and the procedure of extracting the bottleneck device is ended (408).

FIG. 24 is a flow chart continued from the step D in the flow chart of FIG. 22. The flow chart illustrates the production fluctuation measurement function (203) and the bottleneck extracting function (204) of FIG. 21. After step D (501), width and step of the device parameters to be changed are decided (502). A target device is selected (503). Input data is set to simulation and values of device parameters to be changed are decided (504). Next, simulation is performed and the quantity of semi-manufactured goods in process of the whole production system and the production number per unit time at the time that time has been passed sufficiently are measured (505). It is examined whether the measurement is completed in all steps having device parameters changed (506). When not completed (507), processing is returned to step (504). When completed (507), it is examined whether simulation has been completed in all the selected devices (508). When not completed (509), the processing is returned to step (503). When completed (509), a graph for devices having the horizontal axis to which device parameters changed are set and the vertical axis to which the quantity of semi-manufactured goods in process of the whole production system or production number per unit time is set is prepared and the device having the steepest slope is extracted as the bottleneck device (510). Thus, the procedure of extracting the bottleneck device is ended (511).

As described above, the invention made by the inventor has been described concretely with reference to the embodiments, although it is needless to say that the present invention is not limited to the embodiments and various changes may be made without departing from the gist of the invention.

The foregoing description has been made to the embodiment, although the present invention is not limited thereto and it is apparent to those skilled in the art that various changes and modifications can be made without departing from the spirit and the scope of claims of the invention.

INDUSTRIAL APPLICABILITY

According to the present invention, the bottleneck device of the root cause impeding the productivity can be specified early in consideration of even mutual influences among processes of production fluctuation. The structure of continuous productivity improving activity in which attention is paid to the bottleneck device and measures are taken to solve problem can be formed and the productivity of the production system can be improved.

BRIEF DESCRIPTION OF THE DRAWINGS

FIG. 3 is a diagram showing an example of a visualization table utilizing coefficient Cia;

FIG. 4 is a diagram showing an example of a visualization table having background color changed in accordance with value of coefficient Cia;

FIG. 5 is a diagram schematically illustrating semiconductor pre-fabrication process;

FIG. 6 is a diagram explaining data record of manufacturing line result information;

FIG. 7 is a diagram explaining data record of kind-classified process route information;

FIG. 8 is a flow chart showing display processing of production fluctuation visualization table of manufacturing line;

FIG. 9 is a diagram showing an example in which the present invention is applied to manufacturing line of job shop type semiconductor pre-fabrication process;

FIG. 10 is a diagram explaining data record of production plan information;

FIG. 14 is a diagram explaining data record of kind-classified process route and manufacturing device information;

FIG. 15 is a diagram explaining data record of simulation result data;

FIG. 24 is a flow chart showing operation continued from step C in the flow chart for implementing the present invention.

Figure 1:
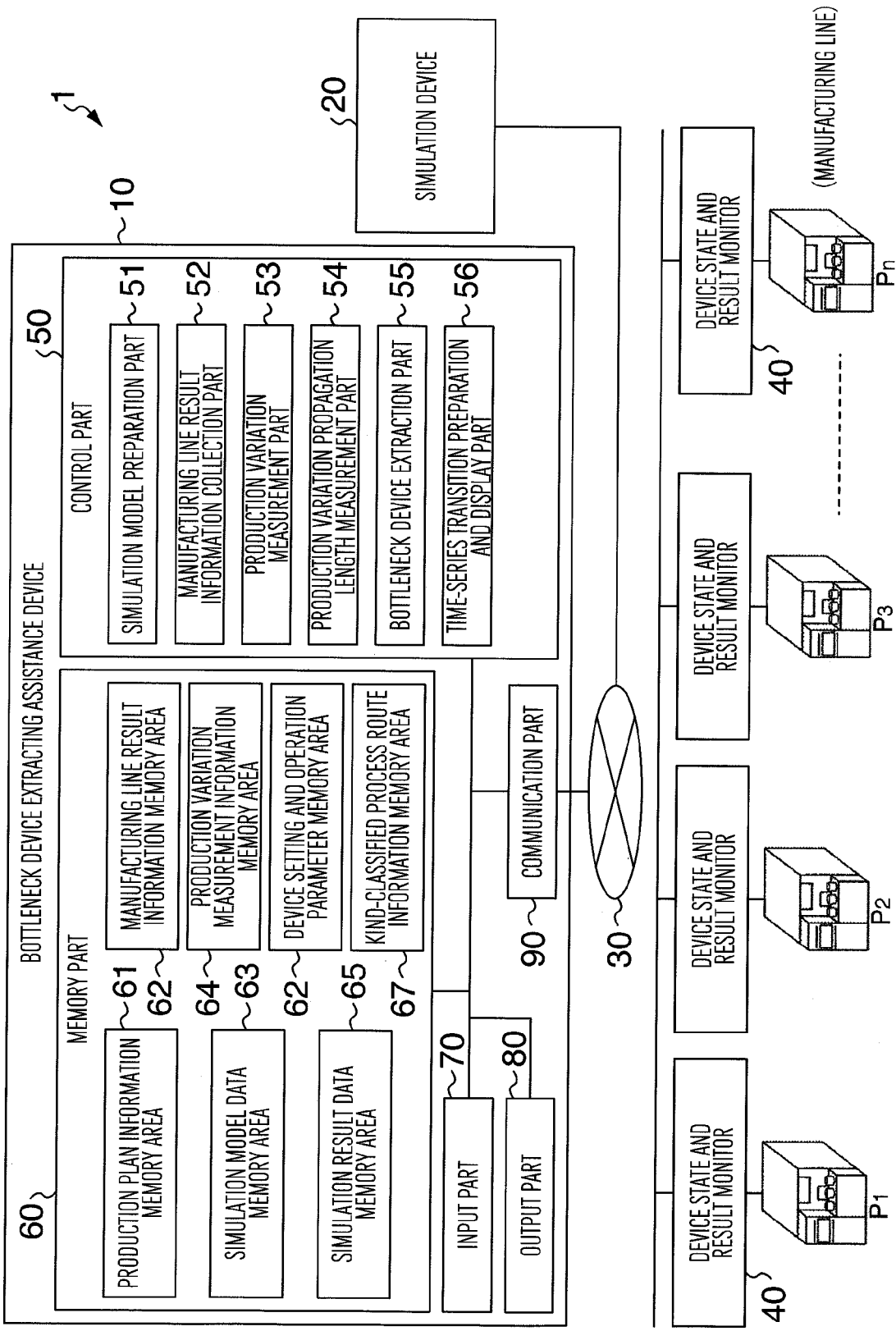
FIG. 1 is a diagram schematically illustrating a bottleneck device extracting assistance system to which an embodiment of the present invention is applied.
Figure 2:
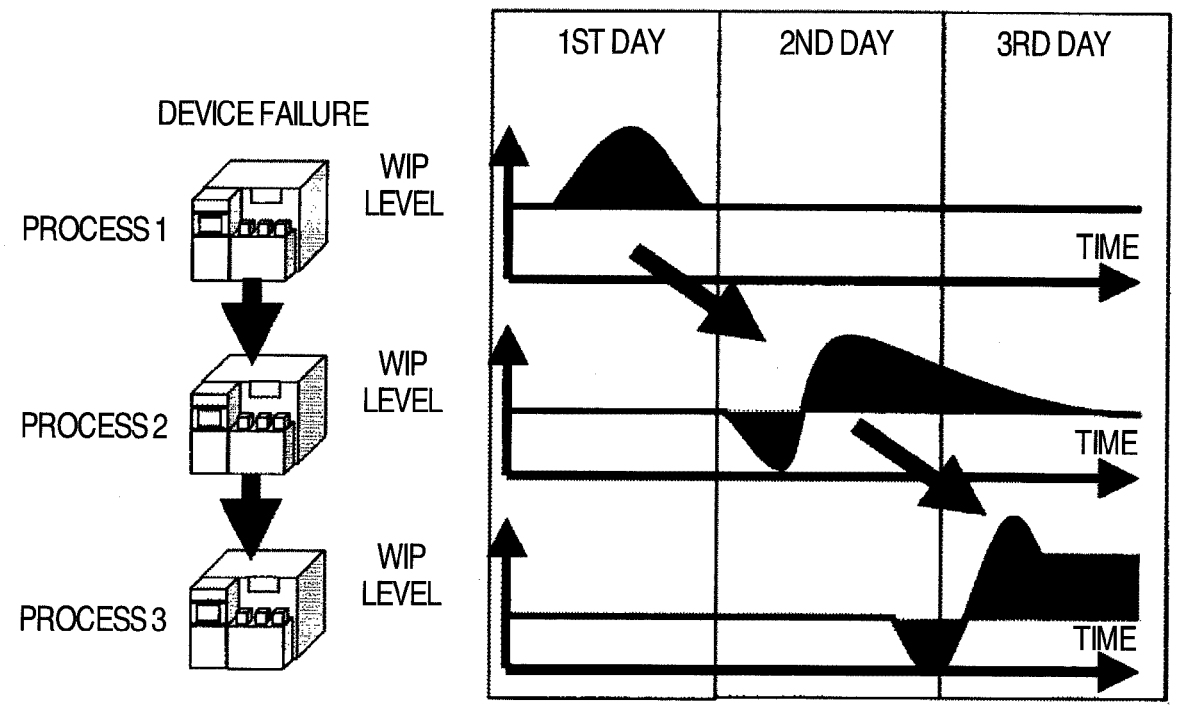
FIG. 2 is a diagram illustrating the state that WIP fluctuation due to device failure generated in process 1 propagates.
Figure 11:
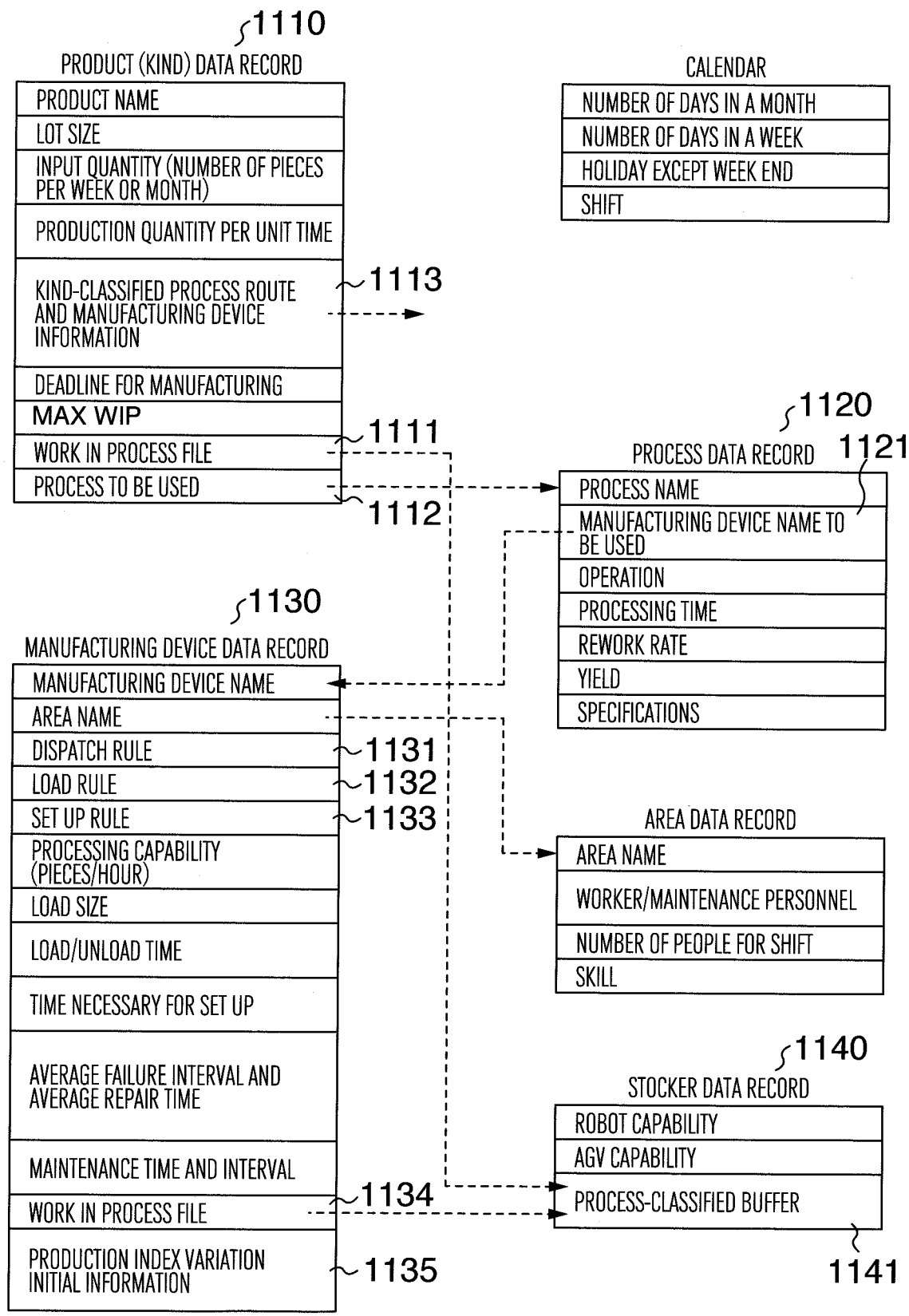
FIG. 11 is a diagram showing an example of simulation model.
Figure 12:
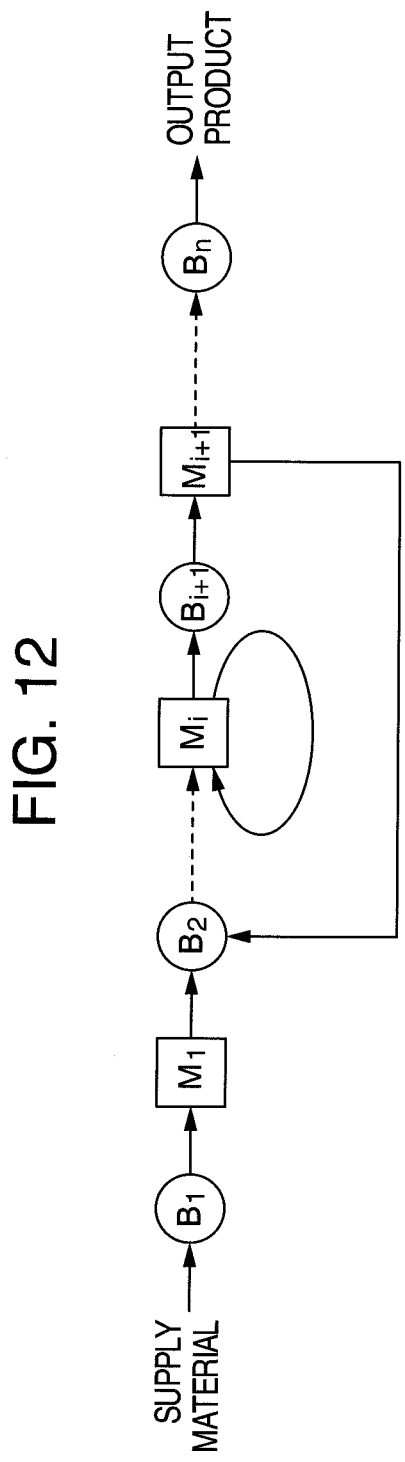
FIG. 12 is a diagram showing a display example of simulation model of manufacturing line.
Figure 13A:
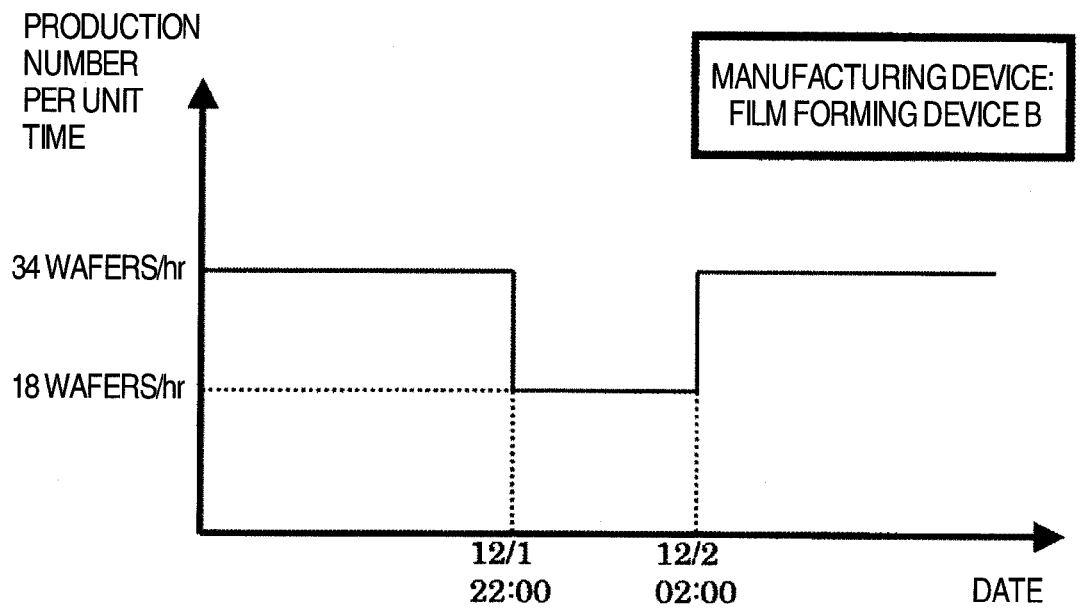
FIG. 13A is a diagram showing an example of production index variation initial information setting picture.
Figure 13B:
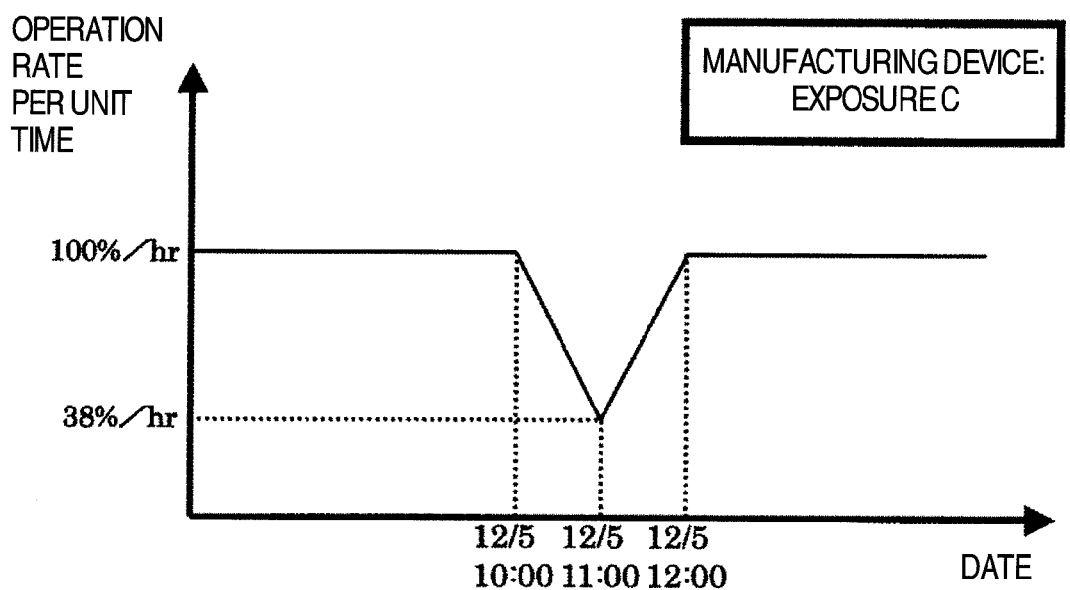
FIG. 13B is a diagram showing an example of production index variation initial information setting picture.
Figure 16:
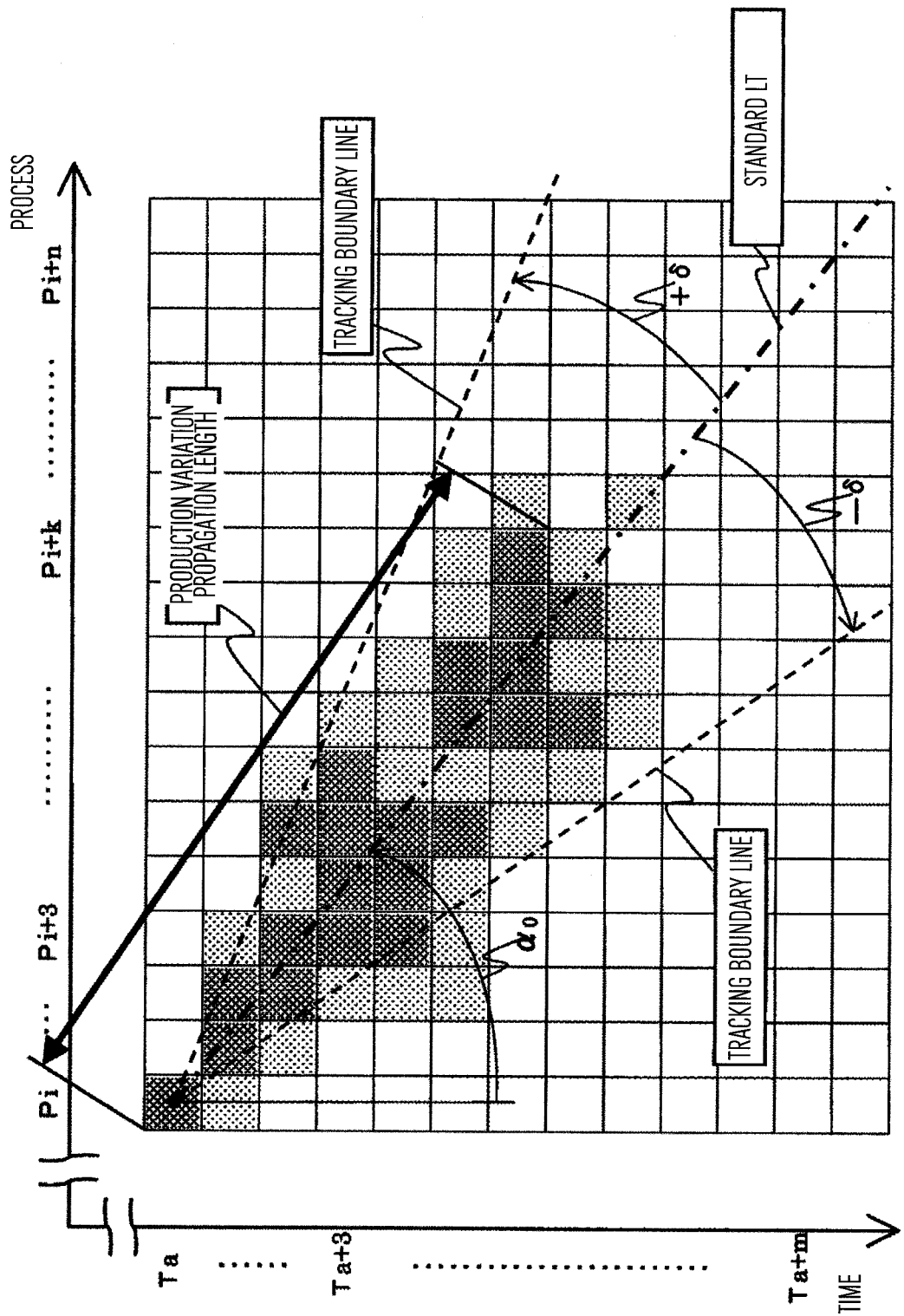
FIG. 16 is a diagram showing a display example of simulation result visualization table.
Figure 17A:
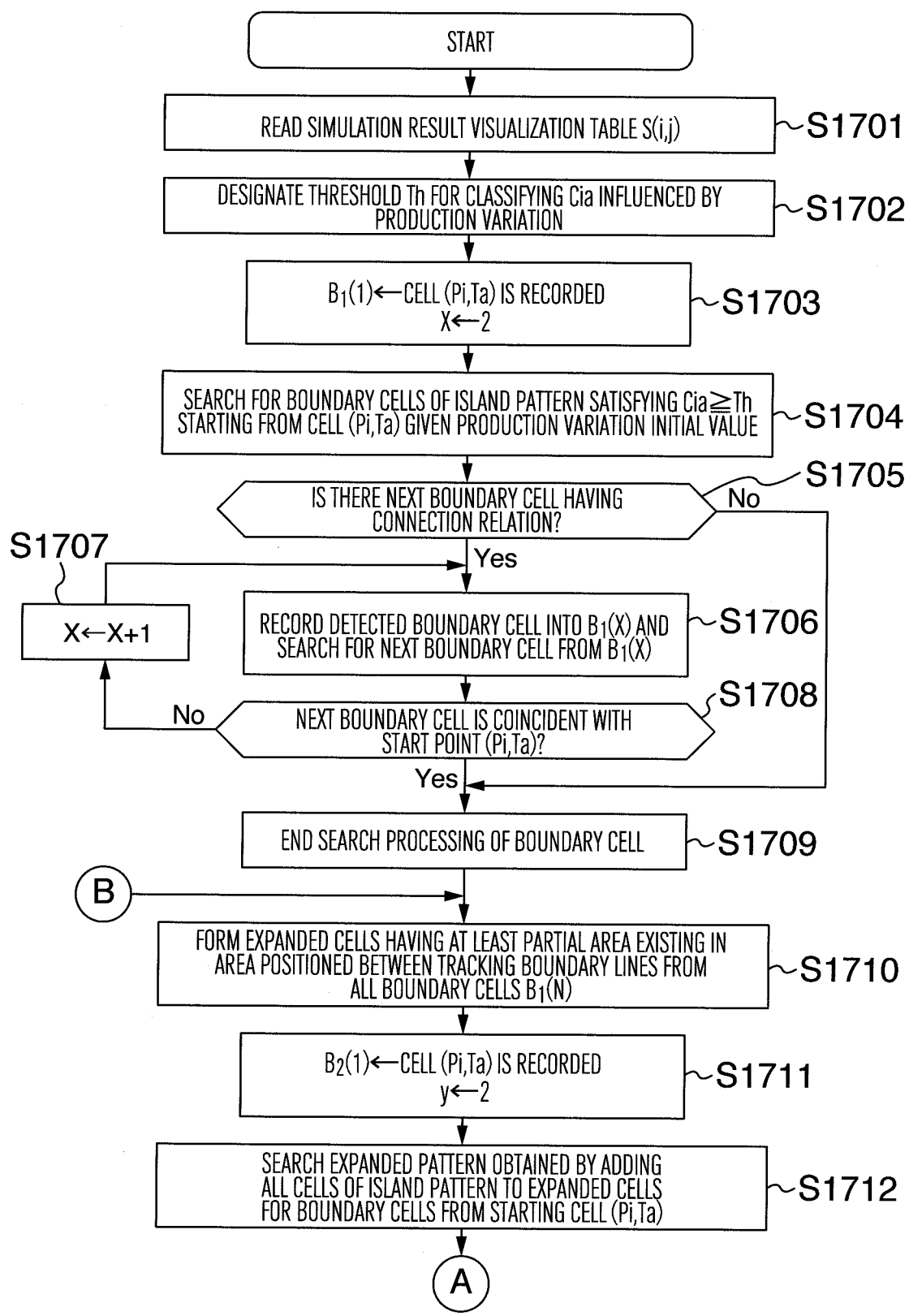
FIG. 17A is a flow chart (part 1) showing production fluctuation propagation length measurement processing.
Figure 17B:
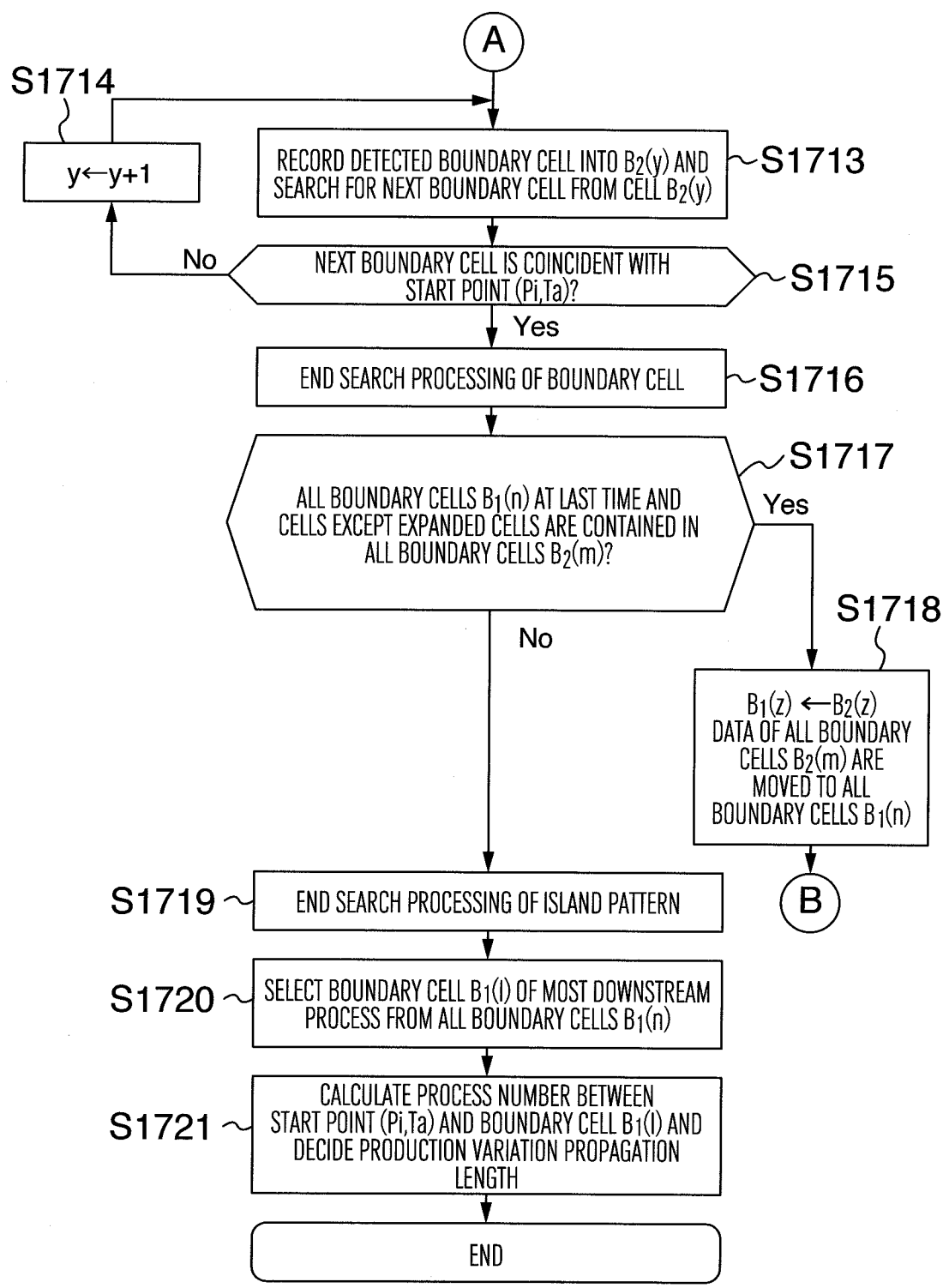
FIG. 17B is a flow chart (part 2) showing production fluctuation propagation length measurement processing.
Figures 18A, 18B, 18C, 18D:
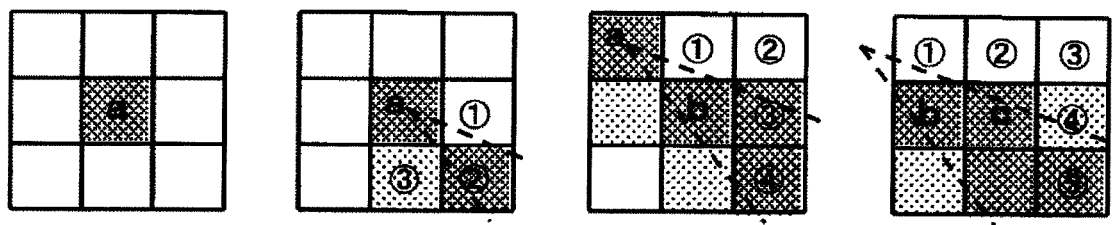
FIG. 18A is a diagram illustrating processing of tracking boundary of island pattern.
FIG. 18B is a diagram illustrating processing of tracking boundary of island pattern.
FIG. 18C is a diagram illustrating processing of tracking boundary of island pattern.
FIG. 18D is a diagram illustrating processing of tracking boundary of island pattern.
Figure 18E:
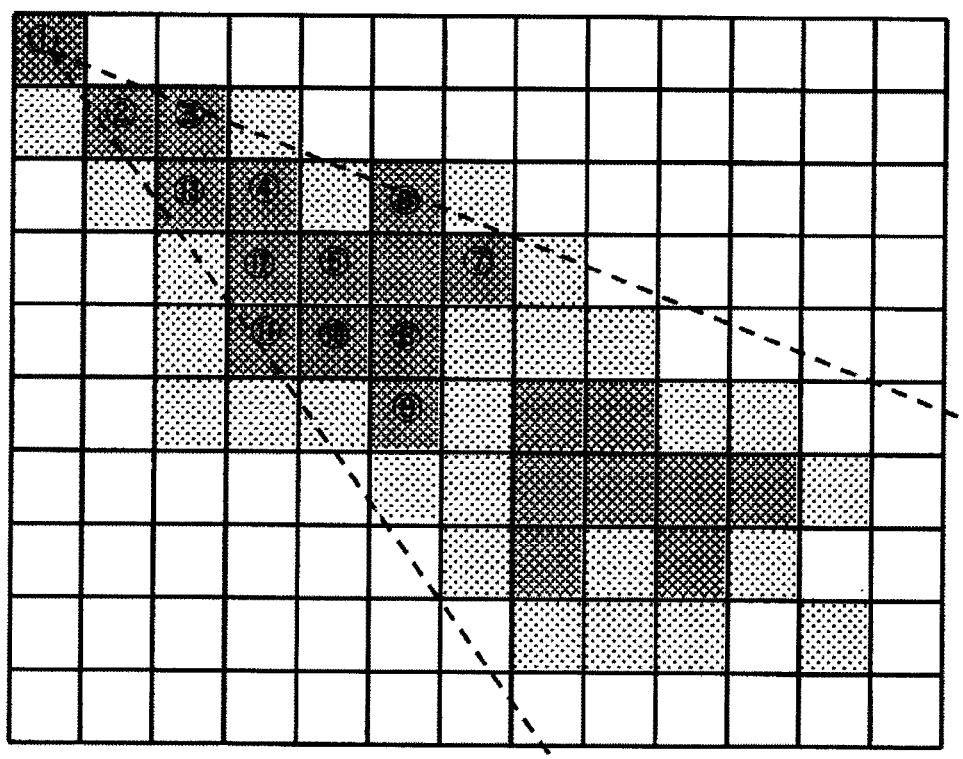
FIG. 18E is a diagram illustrating processing of tracking boundary of island pattern.
Figure 19A:
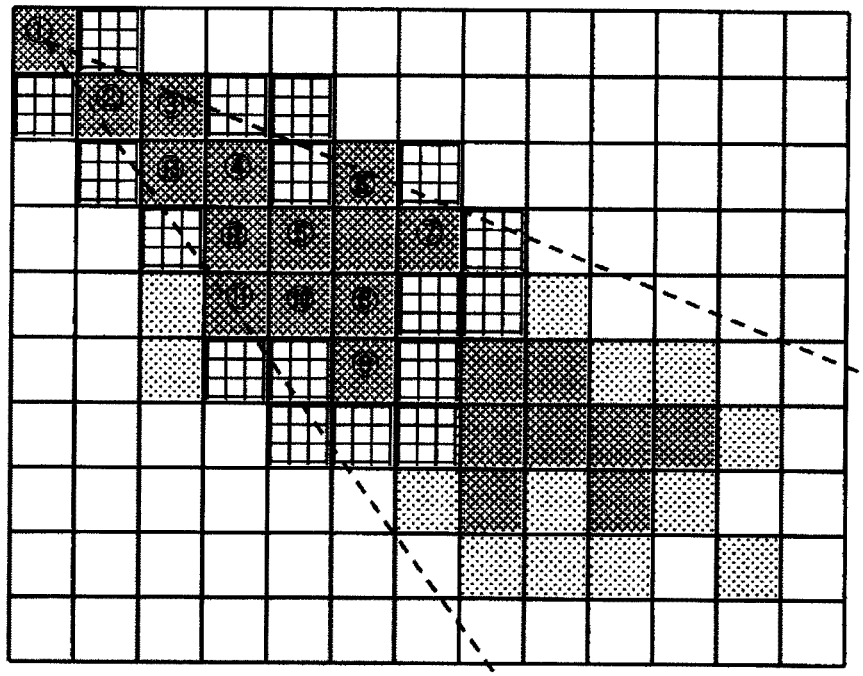
FIG. 19A is a diagram illustrating processing of expanding boundary of island pattern.
Figure 19B:
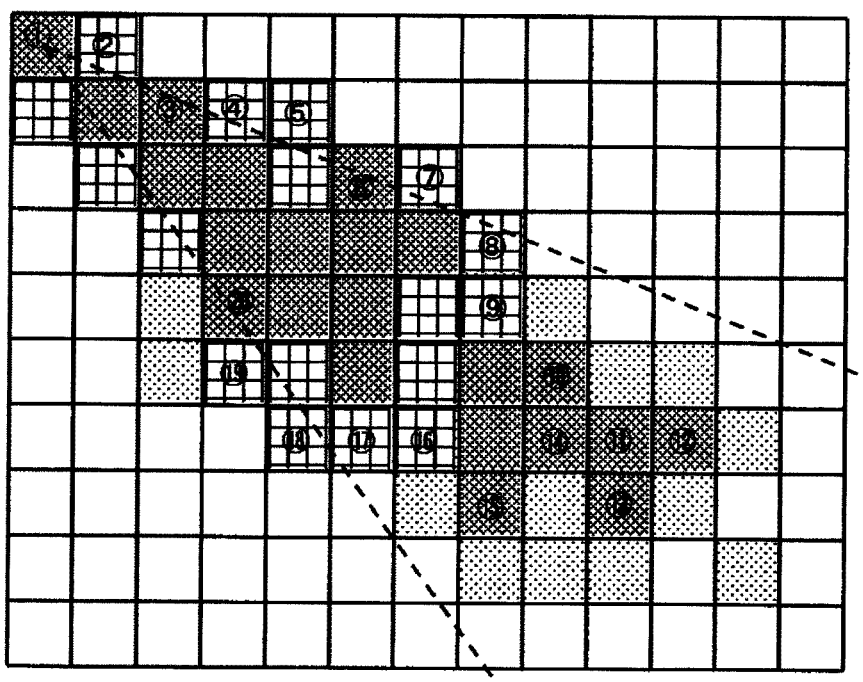
FIG. 19B is a diagram illustrating processing of expanding boundary of island pattern.
Figure 20:
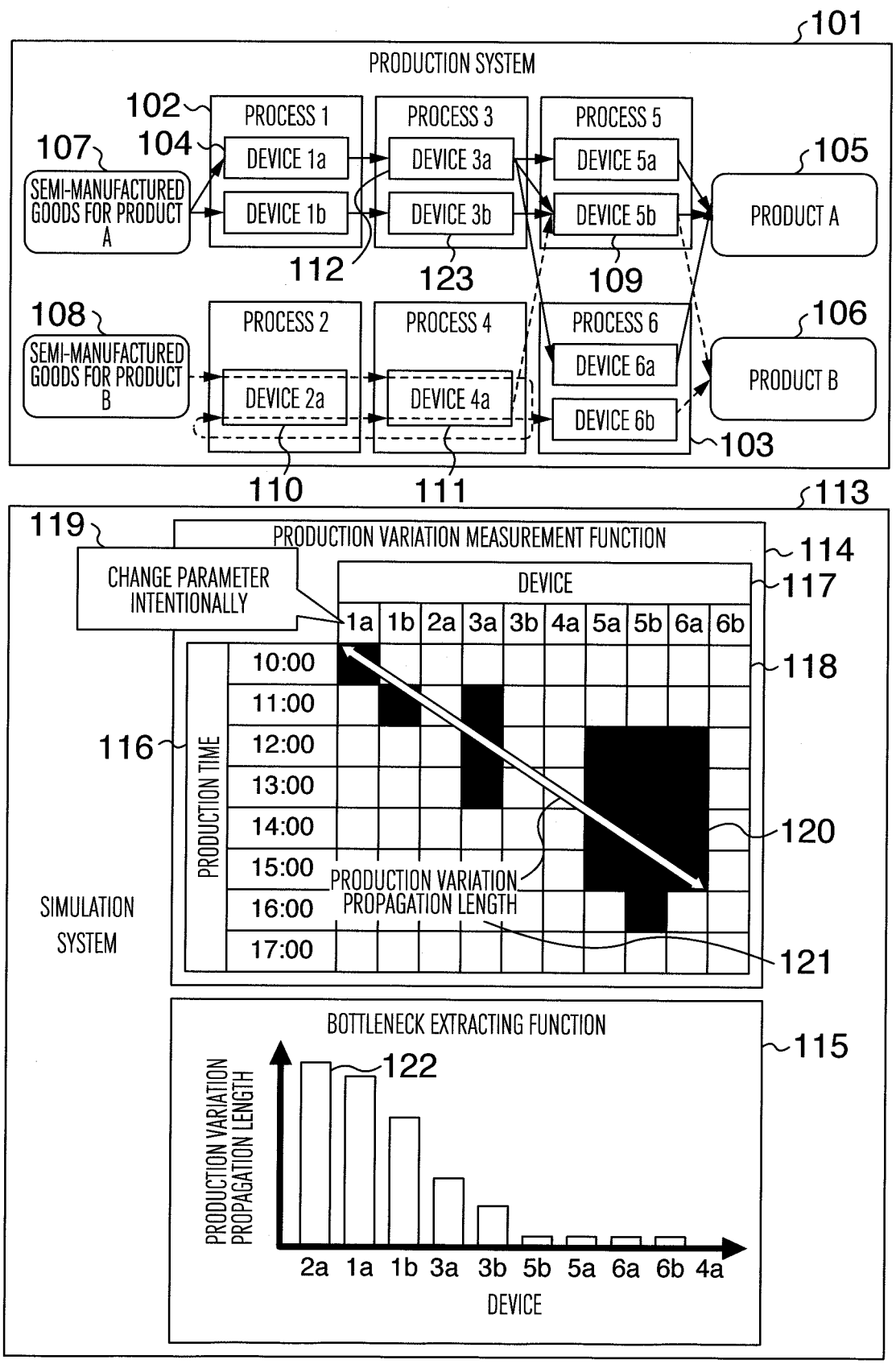
FIG. 20 is a diagram 1 illustrating primary measures for implementing the present invention.
Figure 21:
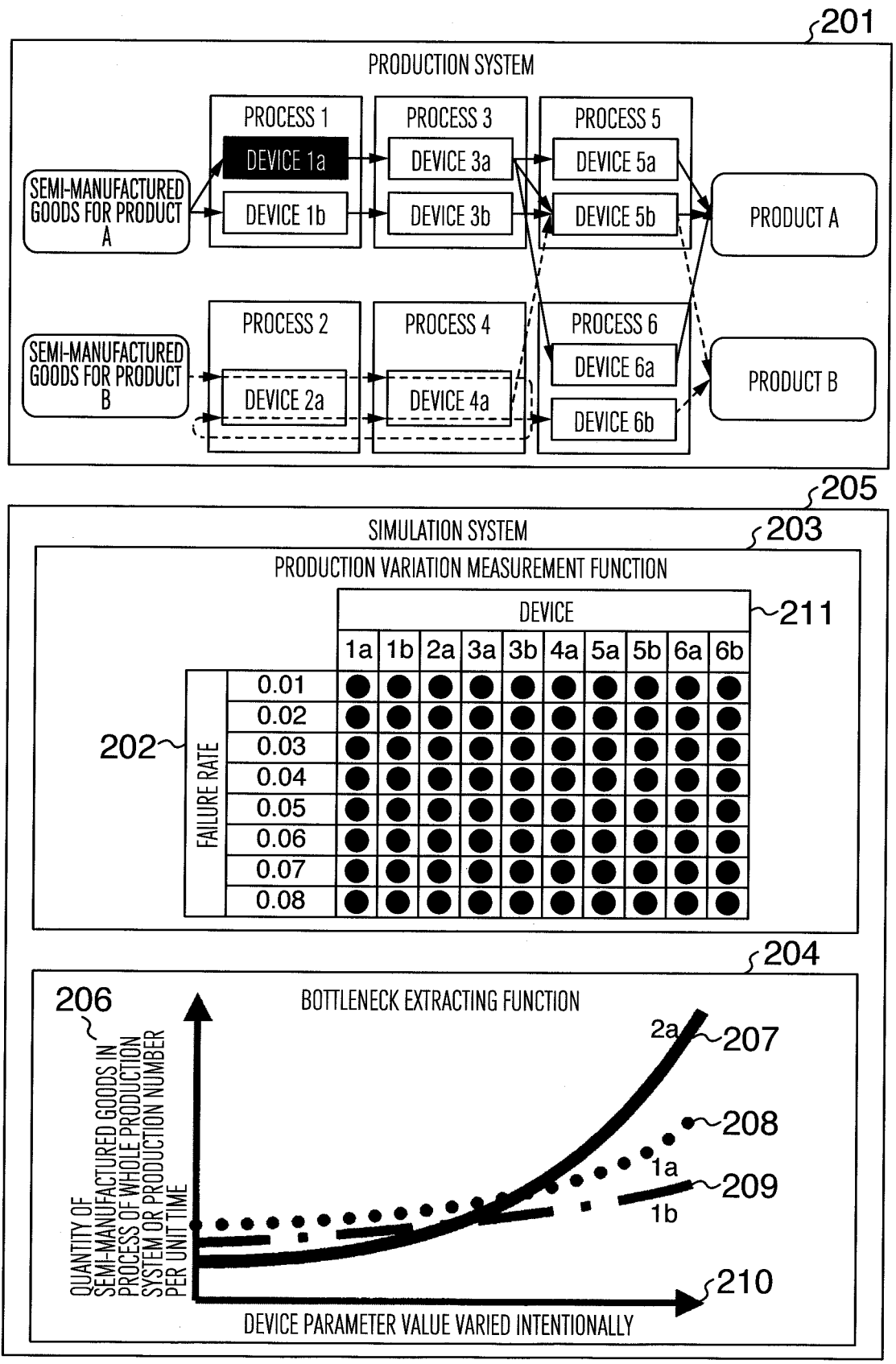
FIG. 21 is a diagram 2 illustrating primary measures for implementing the present invention.
Figure 22:
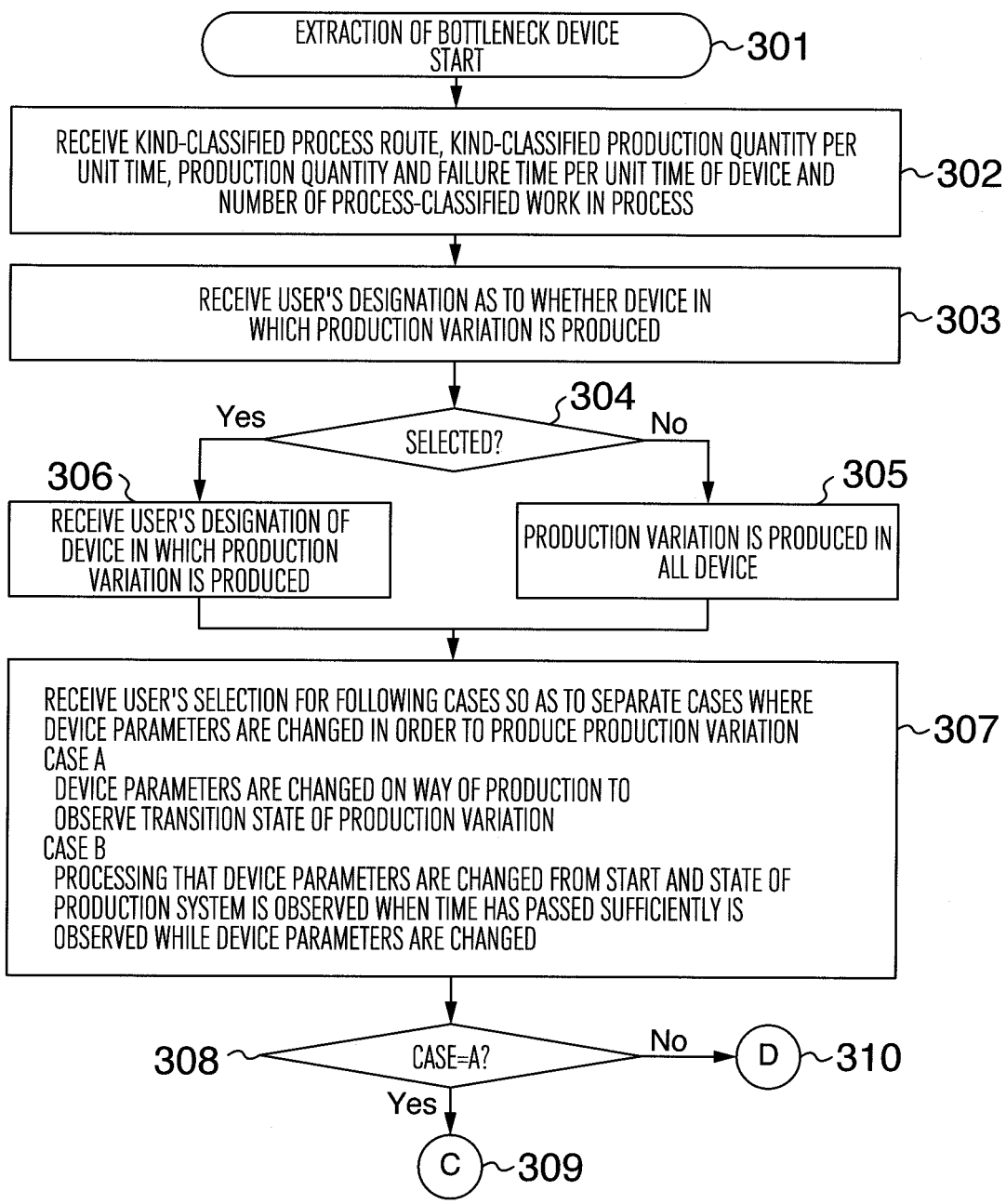
FIG. 22 is a flow chart showing implementation of the present invention.
Figure 23:
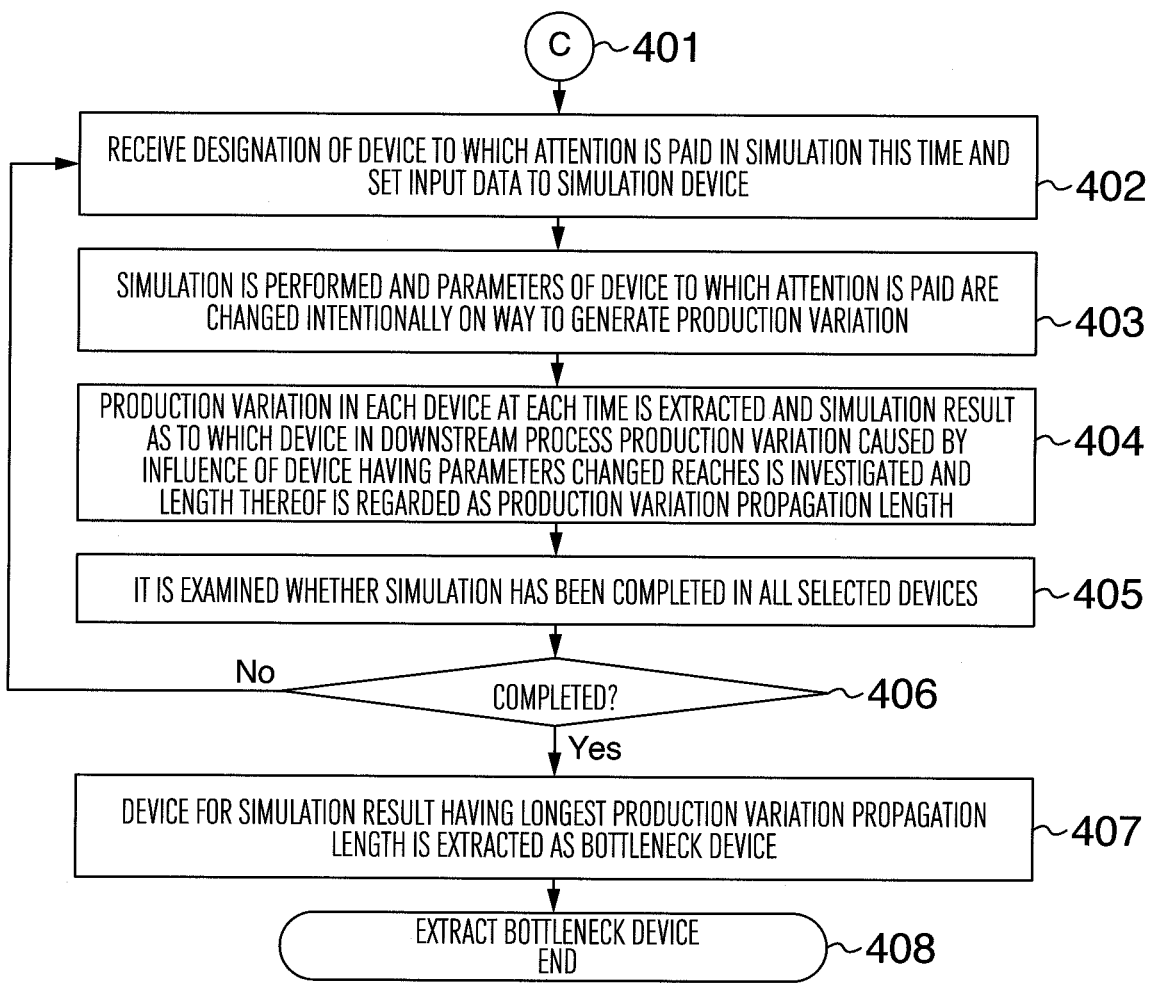
FIG. 23 is a flow chart showing operation continued from step C in the flow chart for implementing the present invention.

The invention claimed is:

1. A method of extracting a bottleneck device which is a cause of impeding productivity of a manufacturing line, comprising:

collecting from manufacturing devices in the manufacturing line, or determining from simulation result data, production indexes of the manufacturing devices;

constituting a two-dimensional array having a horizontal axis to which processes of the manufacturing line or used manufacturing devices arranged along a manufacturing route are set and a vertical axis comprising a time axis partitioned into predetermined time sections equally to be made to correspond to variables;

calculating a moving average, dispersion and variable coefficients from production indexes totalized for each of the time sections while plural time sections are overlapped and storing pertinent ones of the variable coefficients as variables of the two-dimensional array;

classifying values of the variable coefficients based on at least one predetermined threshold and extracting an outline of pattern data of a two-dimensional pattern comprised of two-dimensional array elements to which the variation coefficients of production fluctuations classified as being larger than or equal to said at least one threshold are stored; and searching for number of processes from most upstream process to most downstream process of two-dimensional pattern data having a series of connection relationships to determine a longest production fluctuation propagation length that production fluctuation in an upstream process influences production fluctuation in a downstream process to be outputted.

2. A method of extracting a bottleneck device according to claim 1, wherein two-dimensional pattern data comprised of two-dimensional array elements in which the variation coefficients of the production fluctuations classified as being larger than or equal to the at least one threshold are stored are displayed in pertinent positions of a coordinate system having a horizontal axis to which a row of processes or devices are set and a vertical axis comprising a time axis.

3. A method of extracting a bottleneck device according to claim 1, comprising preparing a simulation model in which variation having any waveform of a designated production index is set in a specific manufacturing device in the manufacturing line on a designated date, and reproducing behavior of the manufacturing line on the basis of the simulation model by a simulation device in a simulation manner and preparing simulation result thereof.

4. A method of extracting a bottleneck device according to claim 1, comprising performing expansion processing of the extracted outline of the two-dimensional pattern data in order to connect a process in which another two-dimensional pattern data separated from the connection relation exists to a downstream process after implementation of the outline extracting processing of the two-dimensional pattern data having the series of connection relationships, and performing outline extracting processing of expanded two-dimensional pattern data containing the other two-dimensional pattern data having the connection relationships produced by the expansion processing to determine the longest production fluctuation propagation length.

5. A method of extracting a bottleneck device according to any of claims 1 to 4, comprising performing the processing of determining the longest production fluctuation propagation lengths to two-dimensional pattern data by the outline extracting processing of the two-dimensional pattern data, totalizing the determined longest production fluctuation propagation lengths of the two-dimensional pattern data to be compared, and specifying a manufacturing device of the most upstream process of two-dimensional pattern data having the longest propagation length among them as a bottleneck device.

6. A method of extracting a bottleneck device according to claim 1, wherein values of the variable coefficients are classified based on at least two predetermined thresholds into classes of: (1) production variation negligible; (2) production variation apt to occur; and (3) production variation always occurs.

* * * * *